(12) United States Patent
Ishida et al.

(10) Patent No.: US 6,498,617 B1
(45) Date of Patent: Dec. 24, 2002

(54) PULSE WIDTH MODULATION CIRCUIT, OPTICAL WRITE UNIT, IMAGE FORMING APPARATUS AND OPTICAL WRITE METHOD

(75) Inventors: Masaaki Ishida, Kanagawa (JP); Hidetoshi Ema, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 82 days.

(21) Appl. No.: 09/689,790

(22) Filed: Oct. 13, 2000

(30) Foreign Application Priority Data

Oct. 15, 1999 (JP) ............................. 11-293717
Mar. 29, 2000 (JP) ........................ 2000-090475

(51) Int. Cl.[7] .................................. B41J 2/47
(52) U.S. Cl. ............................ 347/252; 347/240
(58) Field of Search ................. 347/232, 237, 347/239, 240, 247, 249, 251, 252, 255; 358/456; 332/109

(56) References Cited

U.S. PATENT DOCUMENTS 5,119,045 A * 6/1992 Yutaka ........................ 332/109
5,488,487 A * 1/1996 Ojima et al. ................. 358/456
5,677,725 A * 10/1997 Honbo et al. ................ 347/252
5,905,851 A * 5/1999 Morimoto et al. ........... 347/232

FOREIGN PATENT DOCUMENTS

| JP | 6-248276 | 10/1994 |
|---|---|---|
| JP | 9-183250 | 7/1997 |

* cited by examiner

*Primary Examiner*—Hai Pham
(74) *Attorney, Agent, or Firm*—Oblon, Spivak, McClelland, Maier & Neustadt, P.C.

(57) ABSTRACT

A pulse width modulation circuit is provided with a signal generating circuit generating a reference clock signal and a predetermined signal which is approximately inversely proportional to a digital data input signal, a delay quantity generating circuit delaying the reference clock signal by a desired phase delay to output a pulse signal, based on the predetermined signal from the signal generating circuit, a delay quantity controller controlling a delay quantity of the delay quantity generating circuit, and a modulated signal generator generating a modulated signal which is pulse-width-modulated based on the pulse signal from the delay quantity generating circuit and the reference clock signal.

26 Claims, 24 Drawing Sheets

1 DOT

RF 1

RF 2

RF 3

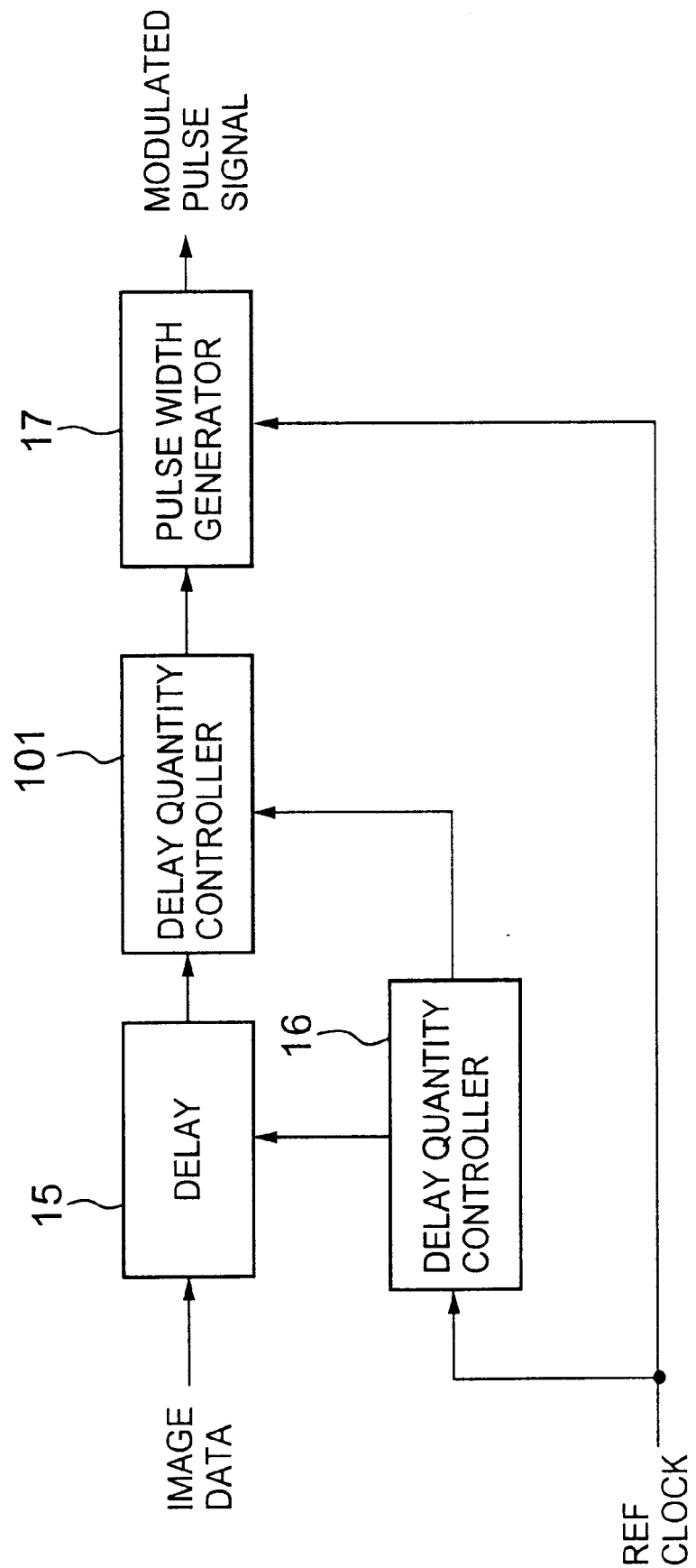

PULSE WIDTH MODULATION CIRCUIT, OPTICAL WRITE UNIT, IMAGE FORMING APPARATUS AND OPTICAL WRITE METHOD

BACKGROUND OF THE INVENTION

This application claims the benefit of Japanese Patent Applications No.11-293717 filed Oct. 15, 1999 and No. 2000-090475 filed Mar. 29, 2000, in the Japanese Patent Office, the disclosure of which is hereby incorporated by reference.

1. Field of the Invention

The present invention generally relates to pulse modulation circuits, optical write units, image forming apparatuses and optical write methods, and more particularly to a pulse width modulation circuit which is used to control an optical output of a light source in a laser printer, a LED printer, an optical disk unit, a digital copying machine, an optical communication unit and the like, and to an optical write unit which uses a modulated signal output from such a pulse width modulation circuit. The present invention further relates to an image forming apparatus, such as a laser printer, a LED printer, a digital copying machine and a facsimile machine, which uses such an optical write unit, and to an optical write method which carries out an optical write operation by employing a pulse width modulation technique.

2. Description of the Related Art

As techniques for modulating an optical output of a light source, there are the power modulation technique which modulates the light quantity itself, the pulse width modulation technique which modulates the ON-time of the light source, and the power-pulse width mixed modulation technique which combines the power modulation technique and the pulse width modulation technique. According to a first pulse width modulation technique, a triangular wave or a sawtooth wave is generated at a corresponding pulse generation period, and is compared with an analog video signal in a comparator so as to generate a pulse width modulated signal. On the other hand, according to a second pulse width modulation technique, a high-frequency clock is digitally frequency-divided so as to generate a delayed pulse, and a pulse width modulated signal is generated by obtaining a logical sum or a logical product of the high-frequency clock and the delayed pulse.

For example, a Japanese Laid-Open Patent Application No.6-284276 proposes an image forming apparatus which makes a gradation representation of an image by the pulse width modulation. This proposed image forming apparatus is provided with a means for determining a delay quantity from an input image signal based on a predetermined reference clock, and a means for generating a signal having a predetermined pulse width which is delayed by a delay time set by the determined delay quantity, and the pulse width modulation is carried out according to the signal having the predetermined pulse width.

On the other hand, a Japanese Laid-Open Patent Application No.9-183250 proposes an image forming apparatus which is provided with a scanning means for scanning a rotary photoconductive body by a light from a light source modulated based on an image signal, a scanning light detecting means for detecting a scanning light from the scanning means at a predetermined position with respect to the rotary photoconductive body, and a reference oscillator. An electrostatic latent image which is dependent on the image signal is formed by scanning the rotary photoconductive body at a predetermined timing based on a detection signal from the scanning light detecting means and an oscillation output of the reference oscillator, and an image dependent on the electrostatic latent image is formed on a recording medium. This proposed image forming apparatus is further provided with a high-frequency clock generating means for generating a high-frequency clock having a frequency n times the oscillation output of the reference oscillator, where n is an integer satisfying $n \geq 2$, an image processing clock generating means for generating an image processing clock signal which is synchronized to the detection signal from the scanning light detecting means based on the high-frequency clock and the detection signal, and a modulating means for modulating the image signal based on the high-frequency clock and generating an image modulated signal, so as to drive the light source based on the image modulated signal.

In image forming apparatuses, there are demands to increase the operation speed. However, in the image forming apparatus which employs the first pulse width modulation technique, it is impossible to realize both the high operation speed and the linearity and reproducibility of the triangular or sawtooth wave. In addition, in the image forming apparatus which employs the second pulse width modulation technique, a maximum operation frequency depends on a device used, and it is impossible to realize both the high operation speed and the high gradation representation of the image.

For example, if a pixel clock has a frequency of 50 MHz and the pulse width modulation is to be carried out using 256 values, it is difficult to obtain satisfactory linearity and swing of the triangular or sawtooth wave at a period of 20 ns of the triangular or sawtooth wave in the case of the first pulse width modulation technique. Furthermore, in the case of the second pulse width modulation technique which digitally frequency-divides the high-frequency clock, it is difficult to realize a circuit structure which generates a clock having a frequency of 12.8 GHZ (=50 MHz×256).

SUMMARY OF THE INVENTION

Accordingly, it is a general object of the present invention to provide a novel and useful pulse modulation circuit, optical write unit, image forming apparatus and optical write method, in which the problems described above are eliminated.

Another and more specific object of the present invention is to provide a pulse modulation circuit, optical write unit, image forming apparatus and optical write method, which can cope with a high operation speed, and realize a high gradation representation of an image, compact size, low cost and low power consumption.

Still another object of the present invention is to provide a pulse width modulation circuit comprising signal generating means for generating a reference clock signal and a predetermined signal which is approximately inversely proportional to a digital data input signal; delay quantity generating means for delaying the reference clock signal by a desired phase delay to output a pulse signal, based on the predetermined signal from the signal generating means; delay quantity control means for controlling a delay quantity of the delay quantity generating means; and modulated signal generating means for generating a modulated signal which is pulse-width-modulated based on the pulse signal from the delay quantity generating means and the reference clock signal. According to the pulse width modulation circuit of the present invention, it is possible to cope with a case where the operation speed is high by use of a high-speed analog delay circuit, so that a high gradation representation of an image is possible, for example.

In the pulse width modulation circuit, the signal generating means may comprises a digital-to-analog converter circuit converting the digital data input signal into an analog signal; and a division circuit generating the predetermined signal based on the analog signal from the digital-to-analog converter circuit. In this case, a high-speed pulse width generation is possible. Hence, it is possible to cope with a case where the operation speed is high by use of a high-speed analog delay circuit, so that a high gradation representation of an image is possible, for example.

In the pulse width modulation circuit, the modulated signal generating means may set a reference time width of pulse width modulation to a value less than a period of the reference clock signal. In this case, it is possible to realize a high resolution without deteriorating the gradation representation of an image.

In the pulse width modulation circuit, the modulated signal generating means may switch a reference time width of pulse width modulation between a value less than a period of the reference clock signal and a value equal to the period of the reference clock signal. In this case, it is possible to realize a high resolution without deteriorating the gradation representation of an image depending on the modulation target.

In the pulse width modulation circuit, a plurality of systems may be provided with respect to the modulated signal generating means, and each of the systems may include the signal generating means and the delay quantity generating means. In this case, it is possible to cope with even higher operation speeds.

In the pulse width modulation circuit, the digital data input signal may be made up of image data, and a writing phase within one dot may be controlled with reference to a non-inverted or inverted clock signals of the reference clock signal. In this case, it is possible to vary the density of the pulse width modulation, and improve the gradation representation at a highlighted part of the image, for example.

A further object of the present invention is to provide a pulse width modulation circuit comprising first signal generating means for generating a high-frequency clock signal synchronized to a reference clock signal by frequency-multiplying the reference signal, and generating a plurality of pulse signals having mutually different phases from the high-frequency clock signal; pulse selecting means for selecting one of the plurality of pulse signals based on upper bit data of a digital data input signal which is synchronized to the reference clock signal; second signal generating means for generating a predetermined signal which is approximately inversely proportional to lower bit data of the digital data input signal; delay quantity generating means for delaying the one of the plurality of pulse signals from the pulse selecting means by a desired phase delay to output a pulse signal, based on the predetermined signal; delay quantity control means for controlling a delay quantity of the delay quantity generating means; and modulated signal generating means for generating a modulated signal which is pulse-width-modulated based on the pulse signal from the delay quantity generating means and the one of the plurality of pulse signals. According to the pulse width modulation circuit of the present invention, it is possible to cope with a case where the operation speed is high by use of a high-speed analog delay circuit, so that a high gradation representation of an image is possible, for example.

In the pulse width modulation circuit, the second signal generating means may comprise a digital-to-analog converter circuit converting the digital data input signal into an analog signal; and a division circuit generating the predetermined signal based on the analog signal from the digital-to-analog converter circuit. In this case, a high-speed pulse width generation is possible. Hence, it is possible to cope with a case where the operation speed is high by use of a high-speed analog delay circuit, so that a high gradation representation of an image is possible, for example.

In the pulse width modulation circuit, the modulated signal generating means may set a reference time width of pulse width modulation to a value less than a period of the reference clock signal. In this case, it is possible to realize a high resolution without deteriorating the gradation representation of an image.

In the pulse width modulation circuit, the modulated signal generating means may switch a reference time width of pulse width modulation between a value less than a period of the reference clock signal and a value equal to the period of the reference clock signal. In this case, it is possible to realize a high resolution without deteriorating the gradation representation of an image depending on the modulation target.

In the pulse width modulation circuit, a plurality of systems may be provided with respect to the modulated signal generating means, and each of the systems may include the second signal generating means and the delay quantity generating means. In this case, it is possible to cope with even higher operation speeds.

In the pulse width modulation circuit, the digital data input signal may be made up of image data, and a writing phase within one dot may be controlled with reference to a non-inverted or inverted clock signals of the reference clock signal. In this case, it is possible to vary the density of the pulse width modulation, and improve the gradation representation at a highlighted part of the image, for example.

Another object of the present invention is to provide an optical write unit which drives a light source by an image modulated signal which is pulse-width-modulated based on input digital multi-level image data, and forms an electrostatic latent image by scanning a photoconductor body by scanning means using a scanning light emitted from the light source, the optical write unit comprising a pulse width modulation circuit outputting the image modulated signal; and a light source driver driving the light source by the image modulated signal output from the pulse width modulation circuit, wherein the pulse width modulation circuit comprises a signal generating circuit generating a reference clock signal and a predetermined signal which is approximately inversely proportional to the input digital multi-level image data; a delay quantity generating circuit delaying the reference clock signal by a desired phase delay to output a pulse signal, based on the predetermined signal from the signal generating circuit; a delay quantity controller controlling a delay quantity of the delay quantity generating circuit; and a modulated signal generator generating the image modulated signal which is pulse-width-modulated based on the pulse signal from the delay quantity generating circuit and the reference clock signal. According to the optical write unit of the present invention, it is possible to realize a high gradation representation of an image even when the operation speed is high.

The optical write unit may further comprise a sensor detecting the scanning light from the scanning means at a predetermined position and outputting a detection signal;

and a clock generator generating the reference clock signal in synchronism with the detection signal, where the clock generator, the light source driver and the pulse width modulation circuit are integrated within a single integrated circuit chip. In this case, the operation is stable with respect to electromagnetic interference (EMI), and the size, cost and power consumption of the optical write unit can all be reduced.

The optical write unit may further comprise character region recognizing means for recognizing a character region from the input digital multi-level image data and outputting a character region signal; and a write data generator generating write data based on the character region signal, wherein the pulse width modulation circuit carries out a pulse width modulation with respect to a non-character region using one period of the reference clock signal as corresponding to one pixel, and carries out a pulse width modulation with respect to the character region using one-half period of the reference clock signal as corresponding to one pixel, in response to the character region signal. In this case, it is possible to obtain a sharp image in the character region, and a smooth image having a high fidelity with respect to the original image in the non-character region of the image.

Still another object of the present invention is to provide an image forming apparatus comprising an optical write unit outputting an image modulated signal which is pulse-width-modulated based on input digital multi-level image data; a light source driven by the image modulated signal; and means for forming an electrostatic latent image by scanning a photoconductor body by scanning means using a scanning light emitted from the light source, the optical write unit comprising a pulse width modulation circuit outputting an image modulated signal; and a light source driver driving the light source by the image modulated signal output from the pulse width modulation circuit, wherein the pulse width modulation circuit comprises a signal generating circuit generating a reference clock signal and a predetermined signal which is approximately inversely proportional to the input digital multi-level image data; a delay quantity generating circuit delaying the reference clock signal by a desired phase delay to output a pulse signal, based on the predetermined signal from the signal generating circuit; a delay quantity controller controlling a delay quantity of the delay quantity generating circuit; and a modulated signal generator generating the image modulated signal which is pulse-width-modulated based on the pulse signal from the delay quantity generating circuit and the reference clock signal. According to the image forming apparatus of the present invention, it is possible to realize a high gradation representation even when the operation speed is high.

Another object of the present invention is to provide an optical write unit which drives a light source by an image modulated signal which is pulse-width-modulated based on input digital multi-level image data, and forms an electrostatic latent image by scanning a photoconductor body by scanning means using a scanning light emitted from the light source, the optical write unit comprising a pulse width modulation circuit outputting the image modulated signal; and a light source driver driving the light source by the image modulated signal output from the pulse width modulation circuit, wherein the pulse width modulation circuit comprises a first signal generating circuit generating a high-frequency clock signal synchronized to a reference clock signal by frequency-multiplying the reference signal, and generating a plurality of pulse signals having mutually different phases from the high-frequency clock signal; a selector selecting one of the plurality of pulse signals based on upper bit data of the input digital multi-level image data which is synchronized to the reference clock signal; a second signal generating circuit generating a predetermined signal which is approximately inversely proportional to lower bit data of the input digital multi-level image data; a delay quantity generating circuit delaying the one of the plurality of pulse signals from the selector by a desired phase delay to output a pulse signal, based on the predetermined signal; a delay quantity controller controlling a delay quantity of the delay quantity generating circuit; and a modulated signal generator generating the image modulated signal which is pulse-width-modulated based on the pulse signal from the delay quantity generating circuit and the one of the plurality of pulse signals. According to the optical write unit of the present invention, it is possible to realize a high gradation representation even when the operation speed is high.

Still another object of the present invention is to provide an image forming apparatus comprising an optical write unit outputting an image modulated signal which is pulse-width-modulated based on input digital multi-level image data; a light source driven by the image modulated signal; and means for forming an electrostatic latent image by scanning a photoconductor body by scanning means using a scanning light emitted from the light source, the optical write unit comprising a pulse width modulation circuit outputting the image modulated signal; and a light source driver driving the light source by the image modulated signal output from the pulse width modulation circuit, wherein the pulse width modulation circuit comprises a first signal generating circuit generating a high-frequency clock signal synchronized to a reference clock signal by frequency-multiplying the reference signal, and generating a plurality of pulse signals having mutually different phases from the high-frequency clock signal; a selector selecting one of the plurality of pulse signals based on upper bit data of the input digital multi-level image data which is synchronized to the reference clock signal; a second signal generating circuit generating a predetermined signal which is approximately inversely proportional to lower bit data of the input digital multi-level image data; a delay quantity generating circuit delaying the one of the plurality of pulse signals from the selector by a desired phase delay to output a pulse signal, based on the predetermined signal; a delay quantity controller controlling a delay quantity of the delay quantity generating circuit; and a modulated signal generator generating the image modulated signal which is pulse-width-modulated based on the pulse signal from the delay quantity generating circuit and the one of the plurality of pulse signals. According to the image forming apparatus of the present invention, it is possible to realize a high gradation representation even when the operation speed is high.

A further object of the present invention is to provide an optical write method for an image forming apparatus which drives a light source by an image modulated signal which is pulse-width-modulated based on input digital multi-level image data, and forms an electrostatic latent image by scanning a photoconductor body by scanning means using a scanning light emitted from the light source, the optical write method comprising the steps of (a) outputting the image modulated signal; and (b) driving the light source by the image modulated signal obtained by the step (a), wherein the step (a) includes (a1) generating a reference clock signal and a predetermined signal which is approximately inversely proportional to the input digital multi-level image data; (a2) delaying the reference clock signal by a desired phase delay to output a pulse signal, based on the predetermined signal; (a3) controlling a delay quantity used in the step (a2); and (a4) generating the image modulated signal which is pulse-width-modulated based on the pulse signal obtained in the step (a2) and the reference clock signal. According to the optical write method of the present invention, it is possible to realize a high gradation representation even when the operation speed is high.

Another object of the present invention is to provide an optical write unit method for an image forming apparatus which drives a light source by an image modulated signal which is pulse-width-modulated based on input digital multi-level image data, and forms an electrostatic latent image by scanning a photoconductor body by scanning means using a scanning light emitted from the light source, the optical write method comprising the steps of (a) outputting the image modulated signal; and (b) driving the light source by the image modulated signal obtained by the step (a), wherein the step (a) includes (a1) generating a high-frequency clock signal synchronized to a reference clock signal by frequency-multiplying the reference signal, and generating a plurality of pulse signals having mutually different phases from the high-frequency clock signal; (a2) selecting one of the plurality of pulse signals based on upper bit data of the input digital multi-level image data which is synchronized to the reference clock signal; (a3) generating a predetermined signal which is approximately inversely proportional to lower bit data of the input digital multi-level image data; (a4) delaying the one of the plurality of pulse signals obtained by the step (a3) by a desired phase delay to output a pulse signal, based on the predetermined signal; (a5) controlling a delay quantity used in the step (a4); and (a6) generating the image modulated signal which is pulse-width-modulated based on the pulse signal obtained by the step (a4) and the one of the plurality of pulse signals. According to the optical write method of the present invention, it is possible to realize a high gradation representation even when the operation speed is high.

Other objects and further features of the present invention will be apparent from the following detailed description when read in conjunction with the accompanying drawings.

BRIEF DESCRIPTION OF THE DRAWINGS

FIG. 24 is a system block diagram showing a fifth embodiment of the pulse width modulation circuit according to the present invention;

DESCRIPTION OF THE PREFERRED EMBODIMENTS

Figure 1:
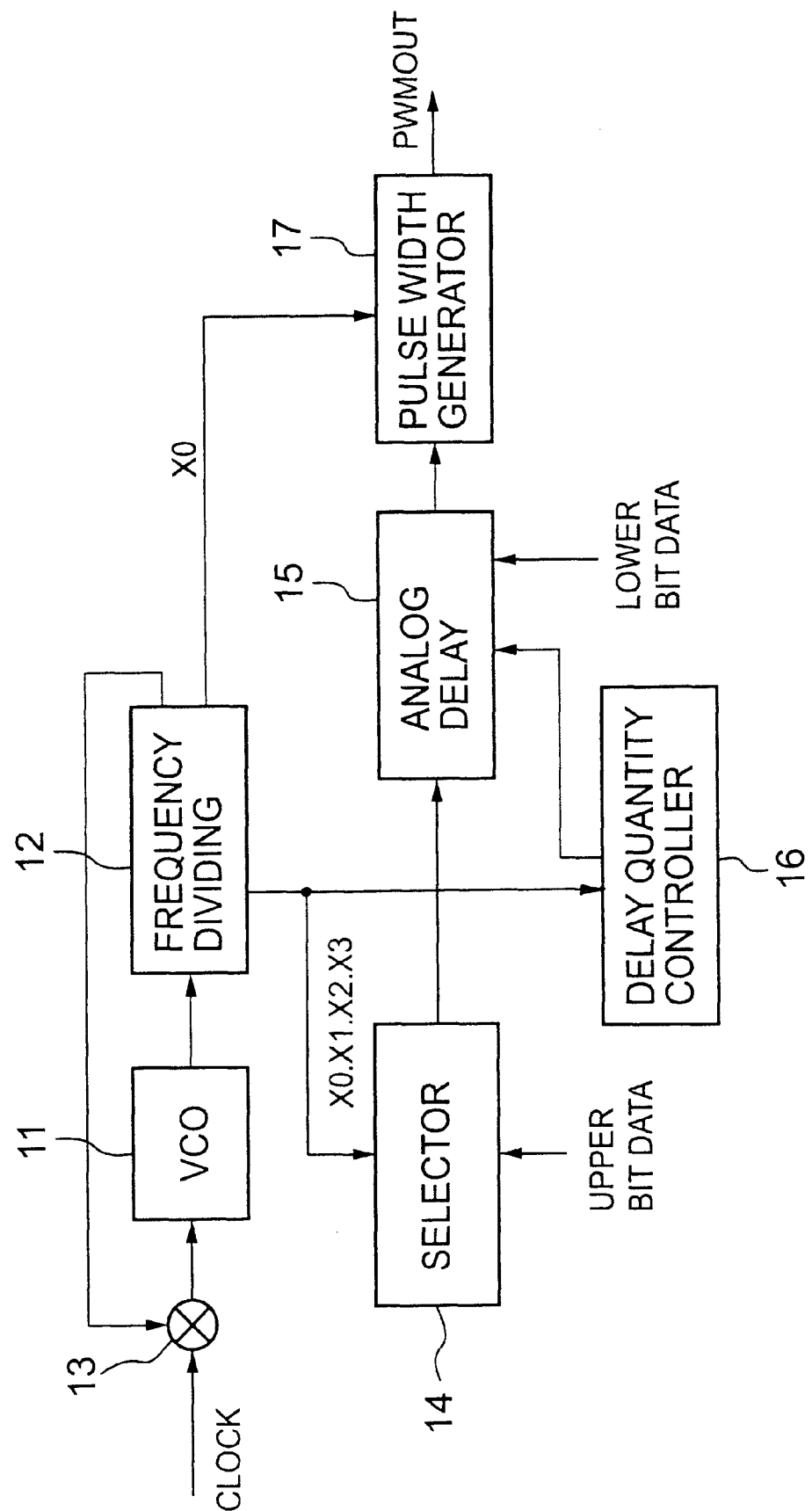
FIG. 1 is a system block diagram showing a first embodiment of a pulse width modulation circuit according to the present invention.

FIG. 1 is a system block diagram showing a first embodiment of a pulse width modulation circuit according to the present invention. In FIG. 1, a PLL circuit, which functions as a frequency multiplying circuit with respect to a pixel clock, includes a voltage controlled oscillator (VCO) 11, a frequency dividing circuit 12, and a phase comparator or a phase frequency comparator 13. The PLL circuit multiplies a value to the frequency of a reference clock signal (pixel clock), and the frequency dividing circuit 12 frequency-divides the frequency-multiplied reference clock signal, so as to generate a plurality of clock signals X0, X1, X2 and X3 having mutually different phases.

A selector 14 selects one of the clock signals X0, X1, X2 and X3 from the frequency dividing circuit 12 based on upper bits (upper bit data) of a digital multi-level image data, that is, a digital data input signal, so as to delay the clock signal X0 based on the upper bit data of the digital multi-level image data. An analog delay 15 subjects a pulse signal (clock signal) output from the selector 14 to an analog delay, in order to delay the pulse signal by a predetermined quantity based on lower bits (lower bit data) of the digital multi-level image data. A delay quantity controller 16 controls the delay quantity of the analog delay 15. A pulse width generator 17 generates an image modulated signal, which is pulse-width-modulated, based on the pulse signal output from the analog delay 15 and one clock signal X0 of the clock signals X0, X1, X2 and X3 output from the frequency dividing circuit 12.

Figure 2:
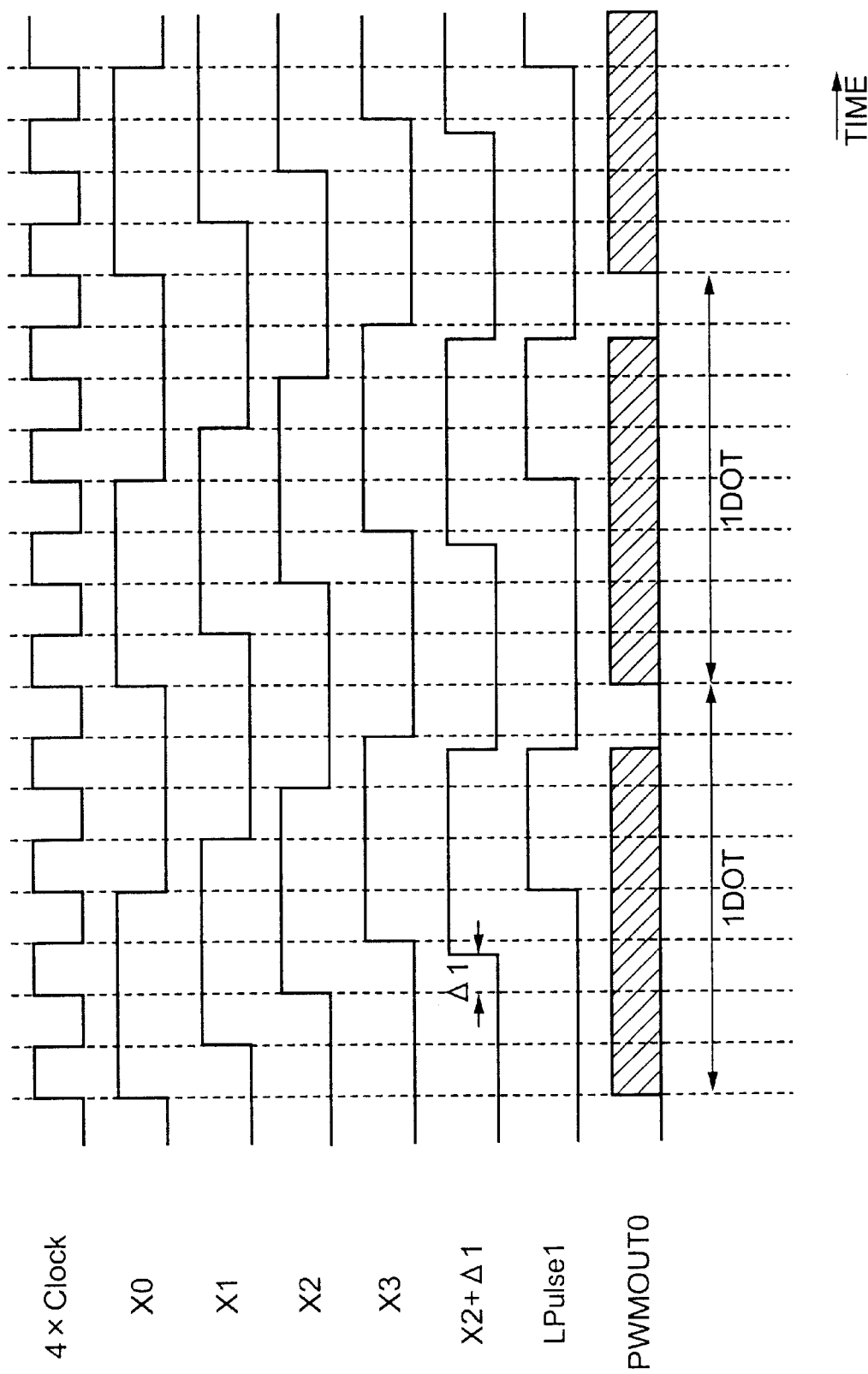
FIG. 2 is a timing chart for explaining the operation of the first embodiment of the pulse width modulation circuit.

FIG. 2 is a timing chart for explaining the operation of the first embodiment of the pulse width modulation circuit. In FIG. 2, it is assumed for the sake of convenience that the PLL circuit frequency-multiples the pixel clock by four, to output a clock signal "4×Clock" having a duty cycle of 50%. The clock signals X0 through X3 which are generated from this clock signal "4×Clock" have phases which mutually differ by $\pi/2$.

Furthermore, it is assumed for the sake of convenience that a pulse width modulation is carried out for thirty-two gradation levels per one dot. Hence, the digital multi-level image data has a most significant bit (MSB) D4 through a least significant bit (LSB) D0, that is, upper bit data D3 and D2, and lower bit data D1 and D0. An output signal PselectL of the selector 14 can be described by the following formula, where "·" indicates a logical product, and "*" indicates inversion such that *D3 indicates an inverted signal of D3, for example. Hence, D3·D2·X3, for example, indicates that the clock signal X3 is selected if D3, D2=(1, 1).

$$PselectL = D4·(D3·D2·X3 + D3·*D2·X2 + *D3·D2·X1 + *D3·*D2·X0) + *D4·(D3·D2·*X3 + D3·*D2·*X2 + *D3·D2·*X1 + *D3·*D2·*X0)$$

Next, when a period of the clock signal X0 is denoted by T, the delay quantity of the analog delay 15 is described by the following, depending on the lower bit data D1 and D0.

$D1·D0$ ($D1, D0$=1, 1): ($3/32$)T Delay $D1·*D0$ ($D1, D0$=1, 0): ($2/32$)T Delay $*D1·D0$ ($D1, D0$=0, 1): ($1/32$)T Delay $*D1·*D0$ ($D1, D0$=0, 0): No Delay For example, when D3, D2, D1, D0=(1, 0, 1, 0), the analog delay 15 carries out a logic operation to generate a signal DPulse which is described by DPulse=X2+Δ1 (=($2/32$)T delay) and shown in FIG. 2, where X2+Δ1 corresponds to the clock signal X2 which is delayed by Δ1. The analog delay 15 carries out a logic operation on the signal DPulse and the clock signal *X0 which originates from the frequency dividing circuit 12, so as to generate an output signal LPulse1 which is described by LPulse1=*X0·(X2+Δ1) and shown in FIG. 2.

It is also assumed for the sake of convenience that, when the MSB signal D4 is "1", the pulse width generator 17 generates a pulse signal during a high-level period of the clock signal X0. As shown in FIG. 2, the pulse width generator 17 outputs an image modulated signal PWMOUT0, which is pulse-width-modulated, for every one dot, based on the output signal LPulse1 of the analog delay 15 and the clock signal X0 from the frequency dividing circuit 12. In other words, the image modulated signal PWMOUT0 is obtained by adding the signal LPulse1 and the clock signal X0. The pulse width modulated signal for forming a dot aligned to the left within one dot is generated in the case shown in FIG. 2.

Figure 3:
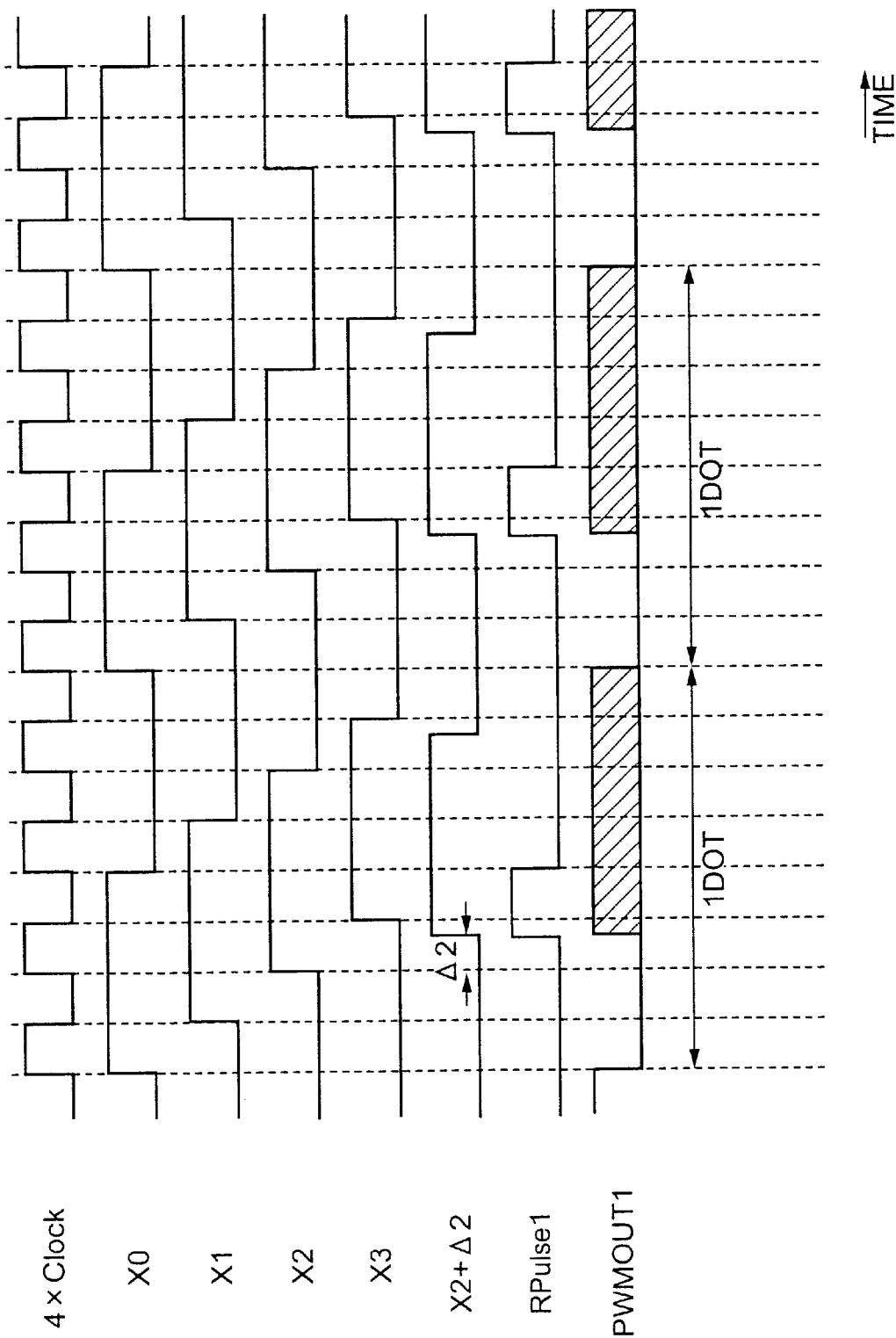
FIG. 3 is a timing chart for explaining the operation of the first embodiment of the pulse width modulation circuit.

However, by appropriately setting the logic of the selector 14 and the analog delay 15, it is also possible to generate a pulse width modulated signal for forming a dot aligned to the right within one dot, as shown in FIG. 3. In FIG. 3, those parts which are the same as those corresponding parts in FIG. 2 are designated by the same reference numerals, and a description thereof will be omitted.

An output signal PselectR of the selector 14 can be described by the following formula, where "·" indicates a logical product, and "*" indicates inversion such that *D3 indicates an inverted signal of D3, for example.

$$PselectR = D4·(D3·D2·X0 + D3·*D2·X1 + *D3·D2·X2 + *D3·*D2·X4) + *D4·(D3·D2·*X0 + D3·*D2·*X1 + *D3·D2·*X2 + *D3·*D2·*X3)$$

Next, when a period of the clock signal X0 is denoted by T, the delay quantity of the analog delay 15 is described by the following, depending on the lower bit data D1 and D0.

$D1·D0$ ($D1, D0$=1, 1): ($1/32$)T Delay $D1·*D0$ ($D1, D0$=1, 0): ($2/32$)T Delay $*D1·D0$ ($D1, D0$=0, 1): ($3/32$)T Delay $*D1·*D0$ ($D1, D0$=0, 0): ($4/32$)T Delay For example, when D3, D2, D1, D0=(0, 1, 0, 1), the analog delay 15 carries out a logic operation to generate a signal DPulse which is described by DPulse=X2+Δ2 (=($3/32$)T delay) and shown in FIG. 3, where X2+Δ2 corresponds to the clock signal X2 which is delayed by Δ2. The analog delay 15 carries out a logic operation on the signal DPulse and the clock signal X0 which originates from the frequency dividing circuit 12, so as to generate an output signal RPulse1 which is described by RPulse1=X0·(X2+Δ2) and shown in FIG. 3.

It is also assumed for the sake of convenience that, when the MSB signal D4 is "1", the pulse width generator 17 generates a pulse signal during a high-level period of the clock signal *X0. As shown in FIG. 3, the pulse width generator 17 outputs an image modulated signal PWMOUT1, which is pulse-width-modulated, for every one dot, based on the output signal RPulse1 of the analog delay 15 and the clock signal X0 from the frequency dividing circuit 12. In other words, the image modulated signal PWMOUT1 is obtained by adding the signal RPulse1 and the clock signal X0.

Therefore, by appropriately setting the logic of the selector 14 and the analog delay 15, it is possible to generate the pulse width modulated signal for forming the dot which is aligned to the right within one dot. Hence, if a mode selector is provided to switch the setting of the logic of the selector 14 and the analog delay 15, it is possible to control the mode selector in response to an external control signal for each dot so as to form the dot aligned to the left or right within one dot.

Figure 4:
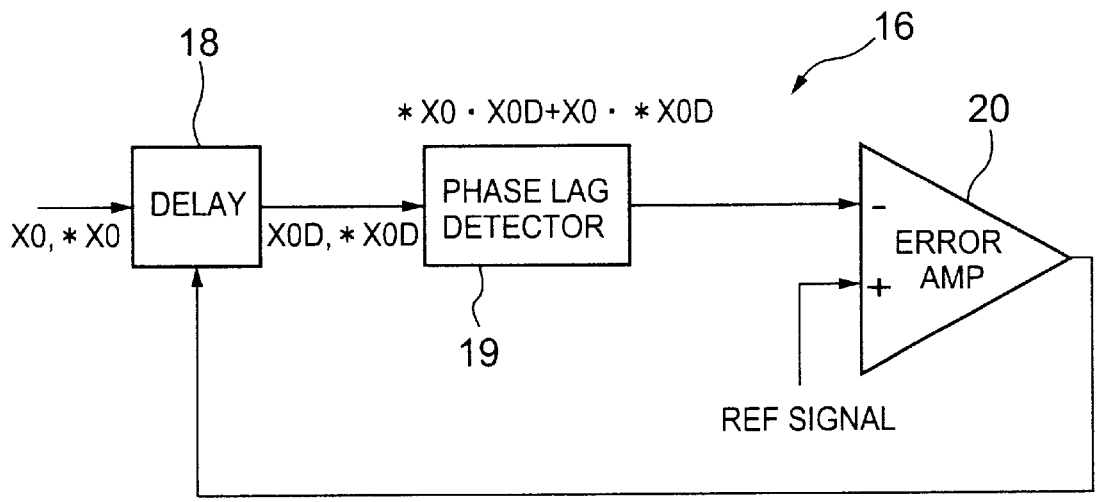
FIG. 4 is a system block diagram showing a first structure of the delay controller.

FIG. 4 is a system block diagram showing a first structure of the delay controller 16. The delay controller 16 shown in FIG. 4 includes a delay 18, a phase lag detector 19 and an error amplifier (or differential amplifier) 20. The clock signals X0 and *X0 from the frequency dividing circuit 12 are delayed by the delay 18, and the phase lag detector 19 detects a phase lag quantity of the clock signals X0 and *X0 received from the delay 18. The error amplifier 20 compares an output signal of the phase lag detector 19 and a reference signal to generate a delay quantity control signal which is dependent on an error therebetween, and controls a delay quantity of the delay 18 by this delay quantity control signal. The output signal of the error amplifier 20 is supplied to the analog delay 15 shown in FIG. 1.

Figure 5:
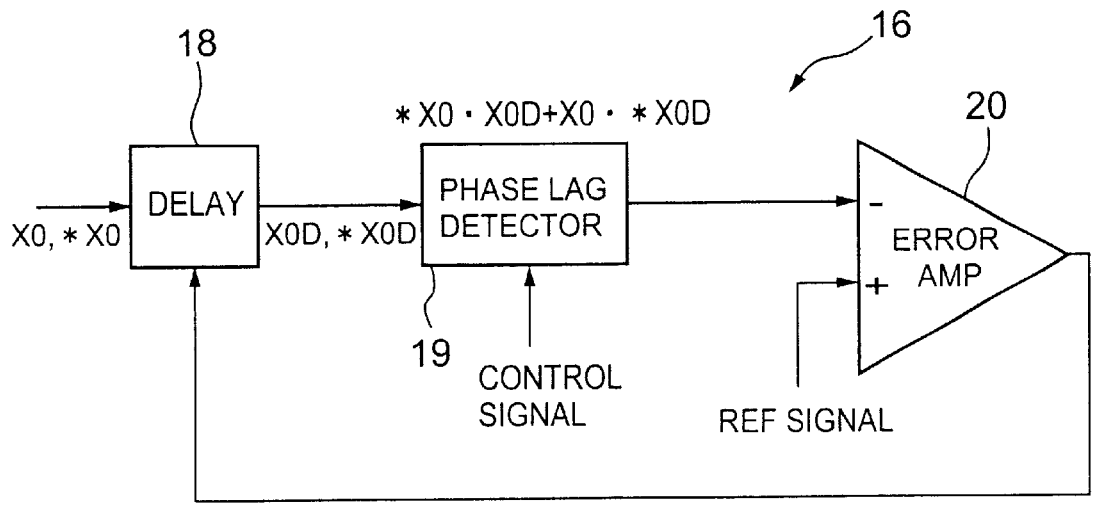
FIG. 5 is a system block diagram showing a second structure of the delay controller.

FIG. 5 is a system block diagram showing a second structure of the delay controller. In FIG. 5, those parts which are the same as those corresponding parts in FIG. 4 are designated by the same reference numerals, and a description thereof will be omitted. In FIG. 5, a control signal is supplied to the phase lag detector 19 so as to control a phase lag detection quantity of the phase lag detector 19. Hence, the construction of the error amplifier 20 can be simplified and the number of required circuit elements can be reduced when compared to the first structure shown in FIG. 4.

Figure 6:
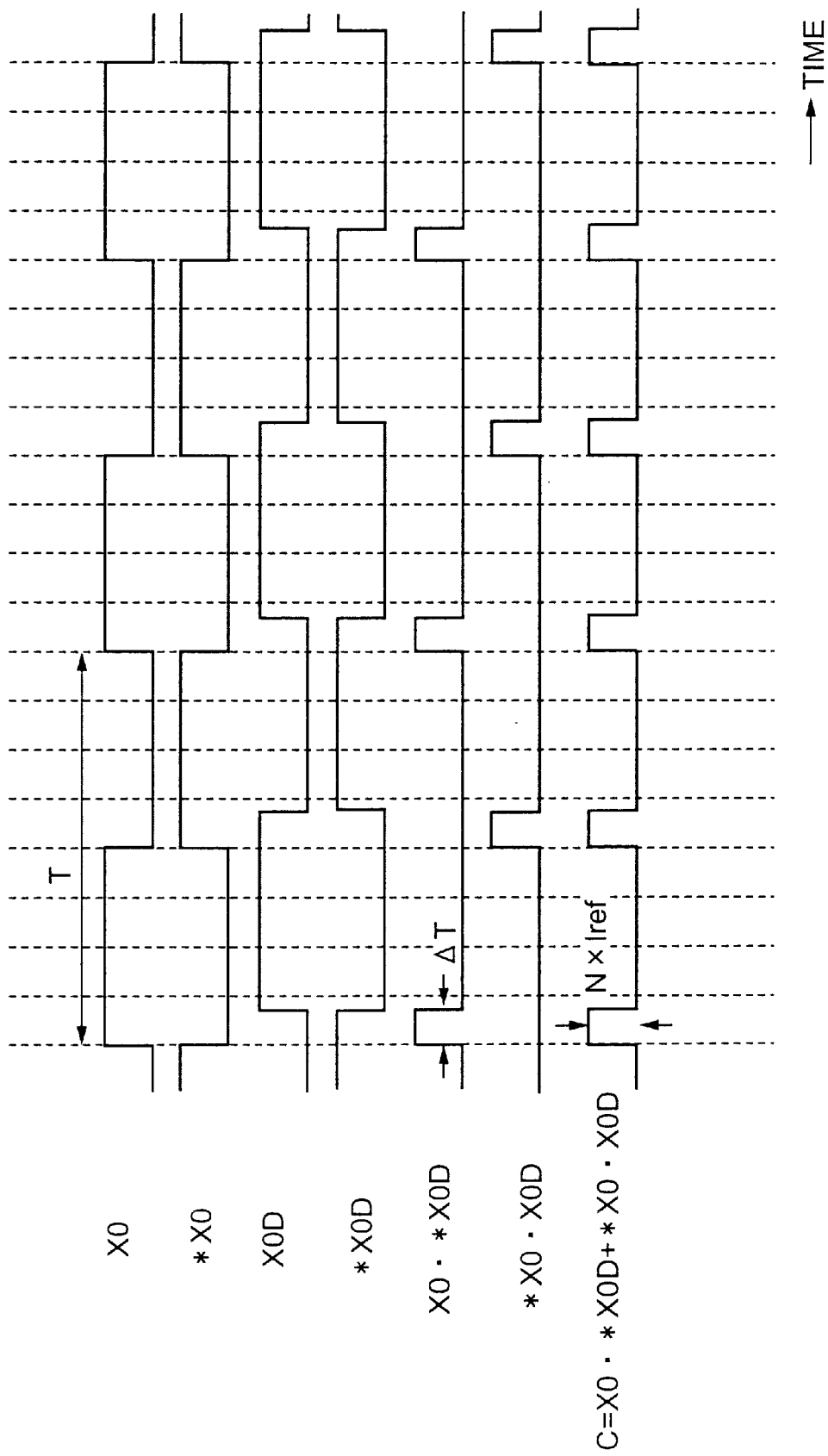
FIG. 6 is a timing chart for explaining the operation of the delay quantity controller.

FIG. 6 is a timing chart for explaining the operation of the delay quantity controller 16. First, the clock signals C0 and *X0 are delayed by a time ΔT in the delay 18, and delayed clock signals X0D and *X0D are supplied to the phase lag detector 19. An output signal C of the phase lag detector 19 can be described by C=X0·*X0D+*X0·X0D. The logic of the phase lag detector 19 is set in this manner, so that it is possible to accurately detect the phase lag quantity even if the duty cycle of the delayed clock signals X0D and *X0D is not 50%. In this case, the output signal C of the phase lag detector 19 has a waveform shown in FIG. 6, such that a pulse of the delay time ΔT appears at a period of T/2. Here, it is assumed for the sake of convenience that the output signal C of the phase lag detector 19 is a current output having a current value described by N×Iref, where N denotes a constant and Iref denotes a current of the reference signal (hereinafter referred to as a reference signal current).

The error amplifier 20 compares the output signal current C of the phase lag detector 19 and the reference signal current Iref, and generates a delay quantity control signal current Idelay which determines the delay quantity of the delay 18. In this case, if N=4, for example, an integrated value of an integrated waveform of the signal current C becomes Iref when the delay time ΔT=T/8, and thus, the delay quantity of the delay 18 is controlled so that the delay time ΔT becomes ΔT=T/8. Generally, the delay time ΔT can be described by ΔT=T/2N. In other words, by freely setting the value of N, it is possible to freely obtain pulse signals which are controlled of the delay time ΔT within a range of one-half period T/2 of the clock signals X0 and *X0.

Figure 7:
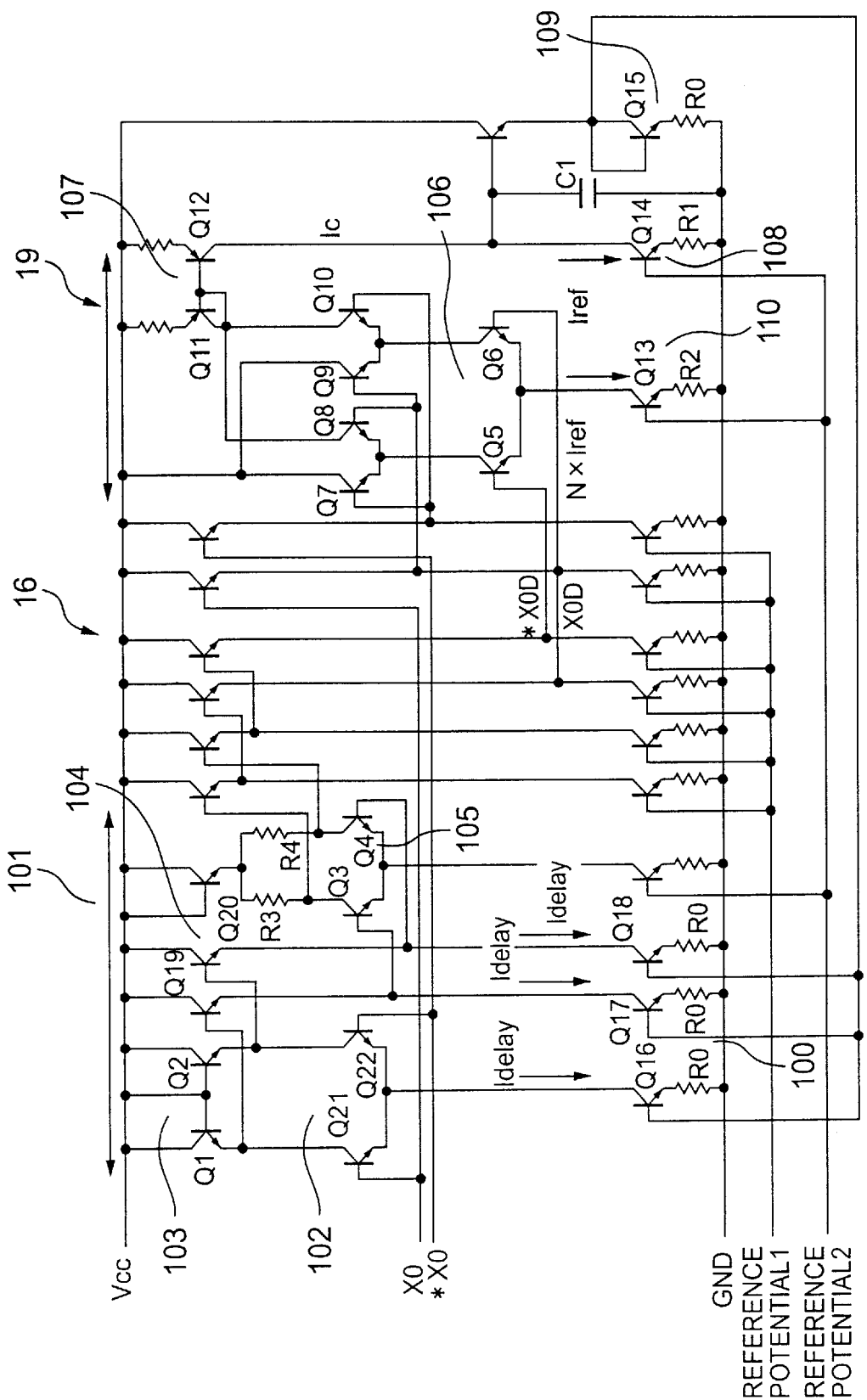
FIG. 7 is a circuit diagram showing the structure of the delay quantity controller formed by bipolar transistors.

FIG. 7 is a circuit diagram showing the structure of the delay quantity controller 16 which is formed by bipolar transistors. In FIG. 7 and subsequent circuit diagrams, Vcc denotes a power source voltage. A delay quantity control signal current Idelay which determines a delay quantity of a delay quantity generator 101 is generated from a current source 100 which is formed by transistors Q16 through Q18 and a resistor R0. The clock signals X0 and *X0 are delayed by a diode load circuit 103 which is formed by transistors Q1 and Q2 and an emitter-follower circuit 104 which is formed by transistors Q19 and Q20, via a differential circuit 102 which is formed by transistors Q21 and Q22.

An output signal of the diode load circuit 103 has an extremely small amplitude. Hence, the swing of the output signal of the diode load circuit 103 is adjusted by outputting an output signal of the emitter-follower circuit 104 via a binarizing circuit 105 which is formed by transistors Q3 and Q4 and resistors R3 and R4. An ECL circuit 106 is formed by transistors Q5 through Q10, and generates an output signal C described by C=*X0·X0D+X0·*X0D based on output signals X0D and *X0D of the binarizing circuit 105. A current Ic corresponding to this output signal C is inverted by a current mirror circuit 107 which is formed by transistors Q11 and Q12, and is compared with a reference signal current Iref by a comparator 108 which is formed by a transistor Q14 and a resistor R1. A collector of the transistor Q14 forming the comparator 108 has a high impedance, and is connected to ground GND via a capacitor C1. Hence, a current generated from a current source 109 which is formed by a transistor Q15 and a resistor R0 generates a current indicative of an error between the output signal current Ic and the reference signal current Iref which are compared by the comparator 108. The output signal of the delay quantity controller 16, which is supplied to the analog delay 15, is obtained from the base or collector of the transistor Q15.

The current sources 100 and 109 respectively have emitter resistances corresponding to the resistor R0, and accordingly form a current mirror circuit in which the same current flows. In other words, a current Idelay is generated by the transistor Q15 and the resistor R0, and an output signal current Idelay of the current mirror circuit which is formed by the transistors Q15 through Q18 and the resistor R0 is controlled by the current Idelay generated by the transistor Q15 and the resistor R0, so that the delay quantity of the delay quantity generator 101 becomes a desired delay quantity.

If a current generated from a current source 110 which is formed by a transistor Q13 and a resistor R2 is N times the reference signal current Iref, it is possible to obtain the delayed clock signals X0D and *X0D which are relayed by the delay time ΔT=T/2N.

When N=4, for example, it is possible to accurately supply a current (4×Iref) to the current source 110, by setting R1:R2=4:1, and setting [an area factor (emitter area) of the transistor Q13]:[an area factor (emitter area) of the transistor Q14]=4:1. Hence, it is possible to generate the delayed clock signals X0D and *X0D which have the delay time ΔT=T/8, that is, a phase lag quantity Δθ=π/4. Therefore, if the delay quantity controller 16 is constructed in this manner with respect to all of the desired delay quantities to be set in the analog delay 15, it is possible to appropriately control all of the desired delay quantities.

Next, a description will be given of the relationship of the delay time ΔT and the current Idelay which generates the delay. For example, in the case of the delay quantity controller 16 shown in FIG. 7, when the clock signal X0 has a high level, the transistor Q22 of the differential circuit 102 is OFF, and as a result, the transistor Q2 which forms a diode load with respect to the transistor Q22 is OFF such that no current flows.

In a transition stage when the clock signal X0 makes a transition from a high level to a low level at a high speed, a current starts to flow to the transistor Q22, but the emitter resistance of the transistor Q2 has a high impedance since virtually no current flows through the transistor Q2. Because a stray capacitance such as a collector-substrate stray capacitance exists at the collector of the transistor Q22, the current flowing through the transistor Q22 becomes a charging and discharging current with respect to a potential change of the stray capacitance.

Generally, when a capacitance is denoted by C, a potential change thereof by ΔV, a current by I, and a charging and discharging time by t, a charge Q can be described by Q=C·ΔV=I·t. In other words, the charging and discharging time t can b described by t=(C·ΔV)/I, and the time required to charge and discharge the stray capacitance, that is, the delay time, is inversely proportional to the charging and discharging current. In the above described case where the delay time ΔT T/8, that is, when the phase lag quantity Δθ=π/4, the relationship of the delay time and the delay quantity control signal current can be described by the following formula (1), where τ denotes a period, K denotes a proportionality constant, I8 denotes a delay quantity control signal current which controls the delay of τ/8, and Δτ denotes a fixed delay constant.

$$\tau/8 = K/I8 + \Delta\tau \qquad (1)$$

Similarly, when a delay quantity control signal current for controlling a delay of τ/8+τ/16 is denoted by I16, a delay quantity control signal current for controlling a delay of $\tau/8+\tau/32$ is denoted by I32, a delay quantity control signal current for controlling a delay of $\tau/8+\tau/64$ is denoted by I64, a delay quantity control signal current for controlling a delay of $\tau/8+\tau/128$ is denoted by I128, and a delay quantity control signal current for controlling a delay of $\tau/8+\tau/256$ is denoted by I256, the following formulas (2) stand.

$$\tau/8+\tau/16=K/I16+\Delta\tau$$
$$\tau/8+\tau/32=K/I32+\Delta\tau$$
$$\tau/8+\tau/64=K/I64+\Delta\tau$$
$$\tau/8+\tau/128K/I128+\Delta\tau$$
$$\tau/8+\tau/256=K/I256+\Delta\tau \quad (2)$$

Hence generally, the following formula (3) stands, where An=16, 32, 64, 128, 256, and IAn=I16, I32, I64, I128, I256.

$$\tau/8+\tau/An=K/IAn+\Delta\tau \quad (3)$$

Accordingly, in a case where the delay quantity controller 16 generates two delay quantity control signals, namely, the delay quantity control signal current I8 for generating the delay $\tau/8$ and the delay quantity control signal current I16 for generating the delay $\tau/16$, it is possible to derive the following formula (4) from the above formulas (1), (2) and (3) by eliminating $\tau$, K and $\Delta\tau$ to describe a delay quantity control signal current In using the delay quantity control signal currents I8 and I16. As will be described later, this current In is the collector current of a transistor Q33 shown in FIG. 8.

$$In=2\cdot I8\cdot I16/\{32\cdot(I8-I16)/An+2\cdot I16\} \quad (4)$$

Figure 8:
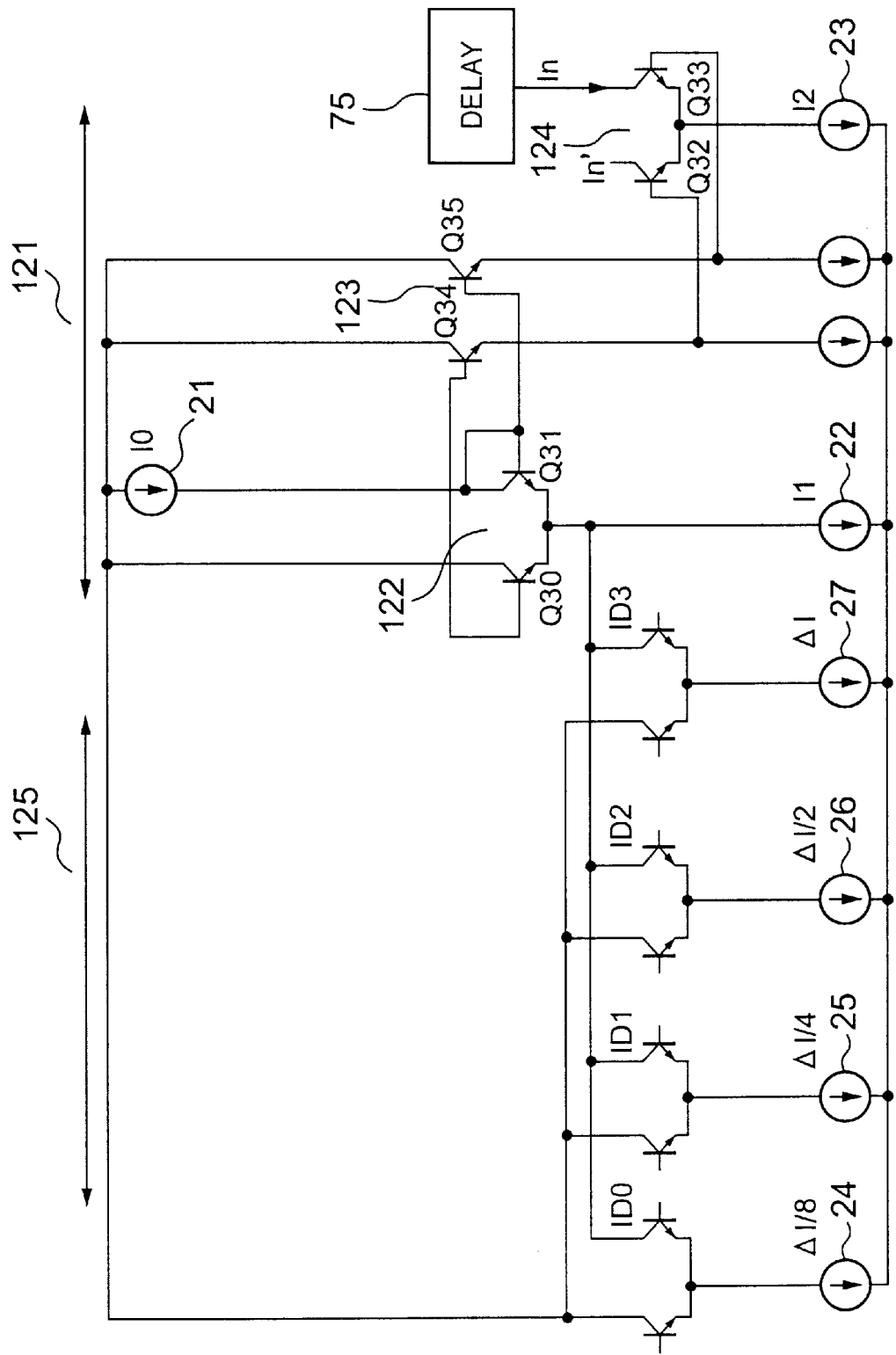
FIG. 8 is a circuit diagram showing the structure of an analog delay.

FIG. 8 is a circuit diagram showing the structure of the analog delay 15 formed by bipolar transistors. First, a description will be given of the operation of a division circuit 121 shown in FIG. 8. The division circuit 121 includes current sources 21, 22 and 23 for generating corresponding currents I0, I1 and I2. A current In flows to a collector of a transistor Q32, and a current In' flows to a collector of the transistor Q33. The output signal of the analog delay 15 is obtained from the collector of the transistor Q33. Differential switches ID0, ID1, ID2 and ID3 receive corresponding currents $\Delta I/8$, $\Delta I/4$, $\Delta I/2$ and $\Delta I$ from the current sources 24, 25, 26 and 27, and are switched depending on the lower bit data D0, D1, D2 and D3 of the digital multi-level image data, so as to add selected ones of the currents. As a result, the lower bit data of the digital multi-level image data are subjected to a digital-to-analog (D/A) conversion in a D/A converter circuit 125 and added to the current I1 from the current source 22. But for the sake of convenience, it is assumed that no current is supplied from the differential switches ID0 through ID3 to be added to the current I1 from the current source 22.

A base potential of a differential circuit 122 which is formed by transistors Q30 and Q31 is input as it is to a base potential of a differential circuit 124 which is formed by transistors Q32 and Q33, via an emitter-follower circuit 123 which is formed by transistors Q34 and Q35. Hence, a current ratio flowing to the differential circuit 122 and a current ratio flowing to the differential circuit 124 are the same.

Accordingly, the following relationships stand.

$$In+In'=I2$$
$$In:In'=I0:(I1-I0)$$

Hence, it may be seen that the division circuit 121 carries out an operation described by the following formula (5).

$$In=I0\cdot I2/I1 \quad (5)$$

Therefore, if the following relationships stand for the formulas (4) and (5) described above, the analog delay 15 can generate the control current described by the formula (4) by the structure shown in FIG. 8, and a delay time of a delay 75 is controlled by the delay quantity control signal current In. The current sources 22 and 23 are respectively controlled by the delay quantity control signal output from the error amplifier 20 shown in FIG. 4 or 5, and the delay 75 delays the clock signal from the selector 14 by a delay time depending on the delay quantity control signal current In. Thus, the clock signal from the selector 14 is delayed in the delay 75 based on the lower bit data of the digital multi-level image data, by a delay quantity which is determined by the delay quantity controller 16. Furthermore, the analog delay 15 obtains the logical product of the delayed clock signal and the clock signal X0 from the frequency dividing circuit 12.

In the case of the analog delay 15 having the structure shown in FIG. 8, the differential switches ID0 through ID3 which form a part of the D/A converter circuit 125, the differential circuit 122 which is formed by the transistors Q30 and Q31, and the differential circuit 124 which is formed by the transistors Q32 and Q33 respectively operate at a high speed. Hence, it is possible to vary the delay quantity for each dot at a high speed, depending on the input image data. Although the circuit structure show in FIG. 8 generates the delay quantity control signal currents I8 and I16 and makes an 8-bit gradation representation (256 gradation levels) per one dot by the differential switches ID0 through ID3 which form a 4-bit switch, it is of course possible to freely generate an appropriate pulse width in a similar manner for larger or smaller number of gradation levels.

According to this embodiment, the pulse width modulation circuit carries out a pulse width modulation based on input digital multi-level image data (input digital data), and includes signal generating means for generating a reference clock signal and a signal approximately inversely proportional to the input digital multi-level image data, delay quantity generating means for delaying the reference clock signal by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from a pulse signal from the delay quantity generating means and the reference clock signal. The signal generating means includes the VCO 11, the frequency dividing circuit 12 and the phase comparator or phase frequency comparator 13 which form the PLL circuit, and the D/A converter circuit 125 and the division circuit 121 within the analog delay 15. The delay quantity generating means includes the delay 75, and the delay quantity control means includes the delay quantity controller 16. The modulated signal generating means includes the pulse width generator 17. Therefore, even if the operation speed is high, it is possible to realize a high gradation representation of the image by use of a high-speed analog delay circuit.

In addition, according to this embodiment, the pulse width modulation circuit carries out a pulse width modulation based on input digital multi-level image data (input digital data), and includes first signal generating means for generating a high-frequency clock signal which is synchronized to a reference clock signal by frequency-multiplying the reference clock signal, and generating a plurality of pulse signals (clock signals) having mutually different phases based on the high-frequency clock signal, pulse selecting means for selecting the plurality of pulse signals based on upper bit data of the input digital multi-level image data synchronized to the reference clock signal, second signal generating means for generating a signal which is approximately inversely proportional to lower bit data of the input digital multi-level image data, delay quantity generating means for delaying the pulse signal from the pulse selecting means by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from the pulse signal from the delay quantity generating means and one of the pulse signals. The first signal generating means includes the VCO 11, the frequency dividing circuit 12 and the phase comparator or phase frequency comparator 13 which form the PLL circuit. The pulse selecting means includes the selector 14. The second signal generating means includes the D/A converter circuit 125 and the division circuit 121 within the analog delay 15. The delay quantity generating means includes the delay 75, and the delay quantity control means includes the delay quantity controller 16. The modulated signal generating means includes the pulse width generator 17. Therefore, even if the operation speed is high, it is possible to realize a high gradation representation of the image by use of a combination of a high-speed analog delay circuit and a digital delay circuit.

Figure 9:
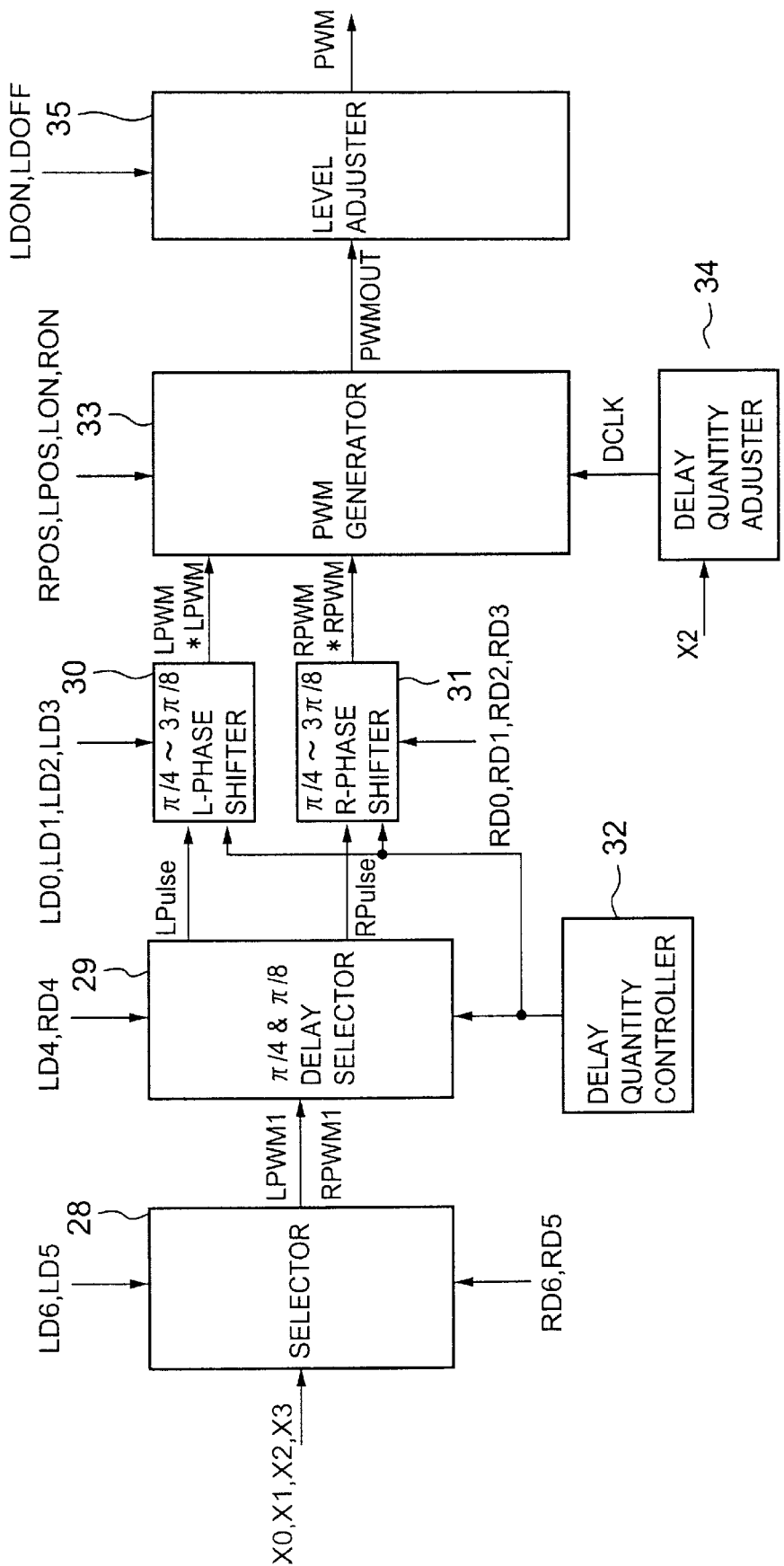
FIG. 9 is a system block diagram showing a second embodiment of the pulse width modulation circuit according to the present invention.

FIG. 9 is a system block diagram showing a second embodiment of the pulse width modulation circuit according to the present invention. In this embodiment, the pulse width modulation circuit generates a pulse width modulated signal for realizing an 8-bit gradation representation (256 gradation levels) per one dot. In FIG. 9, the illustration of a frequency multiplying circuit which is formed by a PLL including a VCO, a frequency dividing circuit and a frequency or phase comparator which generate the plurality of clock signals X0 through X3 from the reference clock (pixel clock) is omitted.

The logic of a selector 28 shown in FIG. 9 can be described by the following, where LPWM1 and RPWM1 denote output signals of the selector 28.

$$LPWM1 = LD6 \cdot LD5 \cdot {}^*X1 + LD6 \cdot {}^*LD5 \cdot {}^*X0 + {}^*LD6 \cdot LD5 \cdot X3 + {}^*LD6 \cdot {}^*LD5 \cdot {}^*X2$$

$$RPWM1 = RD6 \cdot RD5 \cdot {}^*X1 + RD6 \cdot {}^*RD5 \cdot {}^*X0 + {}^*RD6 \cdot RD5 \cdot X3 + {}^*RD6 \cdot {}^*RD5 \cdot {}^*X2$$

Figure 10:
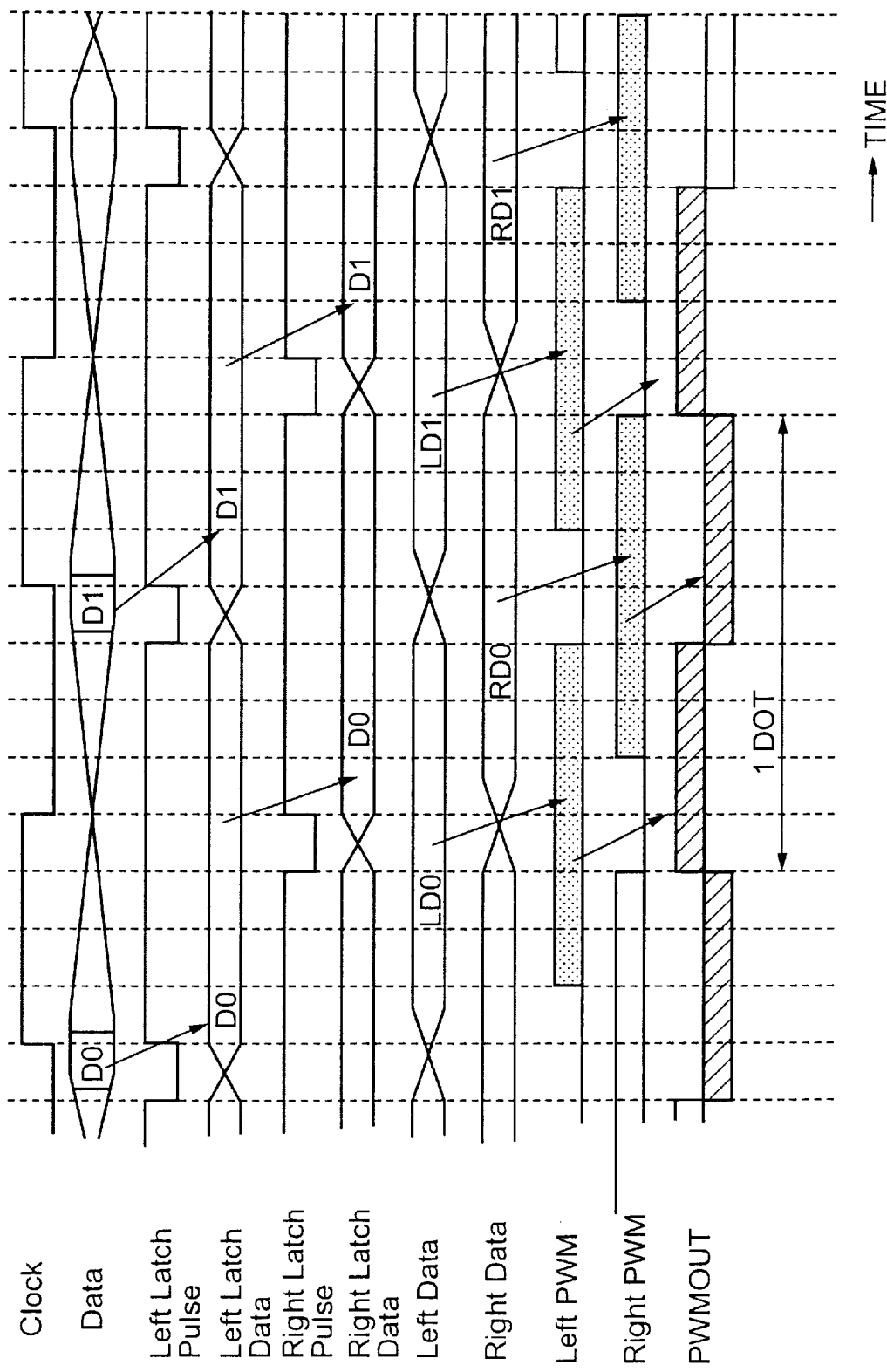
FIG. 10 is a timing chart for explaining the operation of the second embodiment of the pulse width modulation circuit.

LD5, LD6, RD5 and RD6 in the formulas described above denote data which are generated by a logic means (not shown) based on the image data latched by a left latch pulse and a right latch pulse as shown in FIG. 10, according to the following logic. In the following, M denotes a mode switching signal which indicates a normal mode by a high level and indicates a high-speed (double-speed) mode by a low level. In addition, P denotes a position signal which indicates a left mode for forming the dot from the left by a high level, and indicates a right mode for forming the dot from the right by a low level. In addition, the clock signal *X0 is selected when the data LD6, LD5 are 1, 1 by considering a delay quantity at a subsequent stage. FIG. 10 is a timing chart for explaining the operation of this second embodiment of the pulse width modulation circuit.

$$LD6 = M \cdot (P \cdot D6 + {}^*P \cdot {}^*D6) + {}^*M \cdot (D7 \cdot D6 + {}^*D7 \cdot {}^*D6)$$

$$LD5 = M \cdot (P \cdot D5 + {}^*P \cdot {}^*D5) + {}^*M \cdot (D7 \cdot D5 + {}^*D7 \cdot {}^*D5)$$

$$LD4 = M \cdot (P \cdot D4 + {}^*P \cdot {}^*D4) + {}^*M \cdot (D7 \cdot D4 + {}^*D7 \cdot {}^*D4)$$

$$LD3 = M \cdot (P \cdot D3 + {}^*P \cdot {}^*D3) + {}^*M \cdot {}^*(D7 + D6 + D5 + D4)$$

$$LD2 = M \cdot (P \cdot D2 + {}^*P \cdot {}^*D2) + {}^*M \cdot {}^*(D7 + D6 + D3 + D4)$$

$$LD1 = M \cdot (P \cdot D1 + {}^*P \cdot {}^*D1) + {}^*M \cdot {}^*(D7 + D6 + D5 + D4)$$

$$LD0 = M \cdot (P \cdot D0 + {}^*P \cdot {}^*D0) + {}^*M \cdot {}^*(D7 + D6 + D5 + D4)$$

$$RD6 = M \cdot (P \cdot D6 + {}^*P \cdot {}^*D6) + {}^*M \cdot (D3 \cdot D2 + {}^*D3 \cdot {}^*D2)$$

$$RD5 = M \cdot (P \cdot D5 + {}^*P \cdot {}^*D5) + {}^*M \cdot (D3 \cdot D1 + {}^*D3 \cdot {}^*D1)$$

$$RD4 = M \cdot (P \cdot D4 + {}^*P \cdot {}^*D4) + {}^*M \cdot (D3 \cdot D0 + {}^*D3 \cdot {}^*D0)$$

$$RD3 = M \cdot (P \cdot D3 + {}^*P \cdot {}^*D3) + {}^*M \cdot {}^*(D3 + D2 + D1 + D0)$$

$$RD2 = M \cdot (P \cdot D2 + {}^*P \cdot {}^*D2) + {}^*M \cdot {}^*(D3 + D2 + D1 + D0)$$

$$RD1 = M \cdot (P \cdot D1 + {}^*P \cdot {}^*D1) + {}^*M \cdot {}^*(D3 + D2 + D1 + D0)$$

$$RD0 = M \cdot (P \cdot D0 + {}^*P \cdot {}^*D0) + {}^*M \cdot {}^*(D3 + D2 + D1 + D0)$$

$$LON = M \cdot P \cdot D7 + {}^*M \cdot D7 \cdot D6 \cdot D5 \cdot D4$$

$$RON = M \cdot {}^*P \cdot D7 + {}^*M \cdot D3 \cdot D2 \cdot D1 \cdot D0$$

$$RPOS = M \cdot P + {}^*M \cdot D3$$

$$LPOS = M \cdot P + {}^*M \cdot D7$$

In the above described formulas, LON indicates a signal which makes the left part within one dot ON, and RON indicates a signal which makes the right part within one dot ON. These signals LON and RON respectively correspond to a signal LDON which will be described later.

A π/4 and 3π/8 delay selector 29 includes a D/A converter circuit, a division circuit and a delay, similarly to the analog delay 15 shown in FIG. 8, and forms delay quantity generating means. The output signals LPWM1 and RPWM1 of the selector 28 are respectively delayed by the π/4 and 3π/8 delay selector 29 in the following manner, into signals LPulse and RPulse, based on the data LD4 and RD4.

$$LPulse = LD4 \cdot (LPWM1 \text{ delayed by } 3\pi/8) + {}^*LD4 \cdot (LPWM1 \text{ delayed by } \pi/4)$$

$$RPulse = RD4 \cdot (RPWM1 \text{ delayed by } 3\pi/8) + {}^*RD4 \cdot (RPWM1 \text{ delayed by } \pi/4)$$

A delay quantity control signal current I8 for generating a π/4 delay (π/4 phase delay) and a delay quantity control signal current I16 for generating a 3π/8 delay (3π/8 phase delay) in the π/4 and 3π/8 delay selector 29 are controlled by a delay quantity controller 32.

A left-phase (L-phase) shifter 30 outputs a signal LPWM described by the following formula, by inputting the data LD0 through LD3 to the corresponding differential switches ID0 through ID3 forming the 4-bit structure in the circuit shown in FIG. 8. In the following formula, omitted terms are evident from the logic before and after the omission.

$$LPWM = LD3 \cdot LD2 \cdot LD1 \cdot LD0 \cdot (LPulse \text{ delayed by } \pi/4 + 15 \cdot \pi/128) + LD3 \cdot LD2 \cdot LD1 \cdot {}^*LD0 \cdot (LPulse \text{ delayed by } \pi/4 + 14 \cdot \pi/128) + LD3 \cdot LD2 \cdot {}^*LD1 \cdot LD0 \cdot (LPulse \text{ delayed by } \pi/4 + 13 \cdot \pi/128) + \ldots + {}^*LD3 \cdot {}^*LD2 \cdot LD1 \cdot {}^*LD0 \cdot (LPulse \text{ delayed by } \pi/4 + 2 \cdot \pi/128) + {}^*LD3 \cdot {}^*LD2 \cdot {}^*LD1 \cdot LD0 \cdot (LPulse \text{ delayed by } \pi/4 + 1 \cdot \pi/128) + {}^*LD3 \cdot {}^*LD2 \cdot {}^*LD1 \cdot {}^*LD0 \cdot (LPulse \text{ delayed by } \pi/4 + 0 \cdot \pi/128)$$

Similarly, a right-phase (R-phase) shifter 31 outputs a signal RPWM described by the following formula, by inputting the data RD0 through RD3 to the corresponding differential switches ID0 through ID3 forming the 4-bit structure in the circuit shown in FIG. 8. In the following formula, omitted terms are evident from the logic before and after the omission.

RPWM=RD3·RD2·RD1·RD0·(RPulse delayed by $\pi/4$+ 15·$\pi/128$)+RD3·RD2·RD1·*RD0·(RPulse delayed by $\pi/4$+ 14·$\pi/128$)+RD3·RD2·*RD1·RD0·(RPulse delayed by $\pi/4$+ 13·$\pi/128$)+. . . +*RD3·*RD2·RD1·*RD0·(RPulse delayed by $\pi/4$+2·$\pi/128$)+*RD3·*RD2·*RD1·RD0·(RPulse delayed by $\pi/4$+1·$\pi/128$)+*RD3·*RD2·*RD1·*RD0·(RPulse delayed by $\pi/4$+0·$\pi/128$)

By the above described logic, the L-phase shifter 30 can generate from the signal LPulse the signal LPWM which has a phase delay of approximately $\pi/4$ to $3\pi/8$ with respect to the image data. In the analog delay 15 shown in FIG. 8, both the D/A converter circuit 125 and the division circuit 121 operate at a sufficiently high speed and generate the delay quantity control signal currents. However, two phase shifters, namely, the L-phase shifter 30 and the R-phase shifter 31 are provided in this embodiment, because more stable and accurate delayed pulse signals can be obtained by carrying out the delay after the delay control signal currents sufficiently stabilize.

The delay quantity controller 32 has a two-channel structure employing the circuit shown in FIG. 4 or 5, and the delay quantity control signal current I8 for generating the $\pi/4$ delay ($\pi/4$ phase delay) is controlled in one channel, while the delay quantity control signal current I16 for generating the $3\pi/8$ delay ($3\pi/8$ phase delay) is controlled in the other channel.

Next, a description will be given of the operation of a pulse width modulation (PWM) generator 33. A delay quantity adjuster 34 finely adjusts the delay quantity of the clock signal X2 which is received from the PLL circuit and is used as a basic clock for generating a PWM pulse signal, and outputs a clock signal DCLK. The PWM generator 33 receives this clock signal DCLK from the delay quantity adjuster 34. A position control signal POS which determines whether the pulse width is to be aligned from the left or right end of the dot when forming the dot in accordance with the image data is formed into the position signals LPOS and RPOS in a logic means (not shown) based on the formulas described above. The PWM generator 33 also receives these position signals LPOS and RPOS and the signals LON and RON of the formulas described above.

The PWM generator 33 generates a PWM pulse signal PWMOUT described by the following formula (6).

PWMOUT=DCLK·(*LPWM·LPOS+LPWM·*LPOS+LON)+ *DCLK·(*RPWM·RPOS+RPWM·*RPOS+RON)  (6)

By constructing the PWM generator 33 in this manner, it is possible to obtain a 256-value gradation output per dot by the pulse width modulation. In addition, by controlling the write position of the dot, it is possible to realize an image forming apparatus having a high-speed optical write unit capable of freely aligning the dot position to the left or right.

A level adjuster 35 adjusts the level of the PWM pulse signal PWMOUT which is output from the PWM generator 33. When carrying out this level adjustment of the PWM pulse signal PWMOUT, the signal LDON for forcibly turning ON a laser diode (light source) of an optical write unit and a signal LDOFF for forcibly turning OFF the laser diode may be supplied to the level adjuster 35, so as to add the function of forcibly turning ON and turning OFF the laser diode.

During the high-speed (double-speed) mode, the data D7, D6, D5 and D4 may be supplied as the image data corresponding to the left half of the normal dots, and the data D3, D2, D1 and D0 may be supplied as the image data corresponding to the right half of the normal dots, so that the left half and the right half of the normal dots are treated as independent dots and the pulse width modulation for the 4-bit gradation is realized for each of the left and right halves. Although the number of gradation levels decreases when such a high-speed (double-speed) mode is employed, it is possible to realize a pulse width modulation circuit which operates at an apparent operation speed which is higher (doubled), without changing the pixel clock and the transfer rate of the image data.

For example, in a scanning system of an image forming apparatus such as a laser printer and a digital copying machine which causes a laser beam to make a raster scan using a polygonal mirror or the like, it is possible to realize a high-speed optical write unit which operates at a pixel clock frequency or an image data transfer rate which is doubled by doubling the rotational speed of the polygonal mirror. In addition, if the rotational speed of the polygonal mirror is maintained the same, it is possible to realize an optical write unit which can double the scanning density in the main scanning direction. More particularly, if the pixel clock frequency is 50 MHz and an 8-bit modulation (256 gradation levels) can be made per dot (per 20 ns in time) in the normal mode, it is possible to realize a pulse width modulation circuit which can easily carry out a 4-bit (16-value) modulation per dot (per 10 ns in time, corresponding to half dot during the normal mode) in the double-speed mode, by switching the mode by a mode switching section, although the pixel clock frequency and the image data transfer frequency are 50 MHz. Hence, it is possible to realize an optical write unit which uses an output pulse width modulated signal of this pulse width modulation circuit as an image modulated signal, and to realize an image forming apparatus having such an optical write unit. In other words, it is possible to realize an optical write unit and an image forming apparatus which can write at double the pixel clock frequency, without having to change the pixel clock frequency and the image data transfer rate.

Therefore, according to this embodiment, the pulse width modulation circuit carries out a pulse width modulation based on input digital multi-level image data (input digital data), and includes signal generating means for generating a reference clock signal and a signal approximately inversely proportional to the input digital multi-level image data, delay quantity generating means for delaying the reference clock signal by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from a pulse signal from the delay quantity generating means and the reference clock signal. The delay quantity generating means includes the PLL circuit, the L-phase shifter 30 and the R-phase shifter 31. The delay quantity control means includes the delay quantity controller 32. The modulated signal generating means includes the PWM generator 33. Therefore, even if the operation speed is high, it is possible to realize a high gradation representation of the image by use of a high-speed analog delay circuit.

In addition, according to this embodiment, the pulse width modulation circuit carries out a pulse width modulation based on input digital multi-level image data (input digital data), and includes first signal generating means for generating a high-frequency clock signal which is synchronized to a reference clock signal by frequency-multiplying the reference clock signal, and generating a plurality of pulse signals (clock signals) having mutually different phases based on the high-frequency clock signal, pulse selecting means for selecting the plurality of pulse signals based on upper bit data of the input digital multi-level image data synchronized to the reference clock signal, second signal generating means for generating a signal which is approximately inversely proportional to lower bit data of the input digital multi-level image data, delay quantity generating means for delaying the pulse signal from the pulse selecting means by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from the pulse signal from the delay quantity generating means and one of the pulse signals. The first signal generating means includes the PLL circuit. The pulse selecting means includes the selector 28. The delay quantity generating means includes the L-phase shifter 30 and the R-phase shifter 31, and the delay quantity control means includes the delay quantity controller 32. The modulated signal generating means includes the PWM generator 33. Therefore, even if the operation speed is high, it is possible to realize a high gradation representation of the image by use of a combination of a high-speed analog delay circuit and a digital delay circuit.

Figure 11:
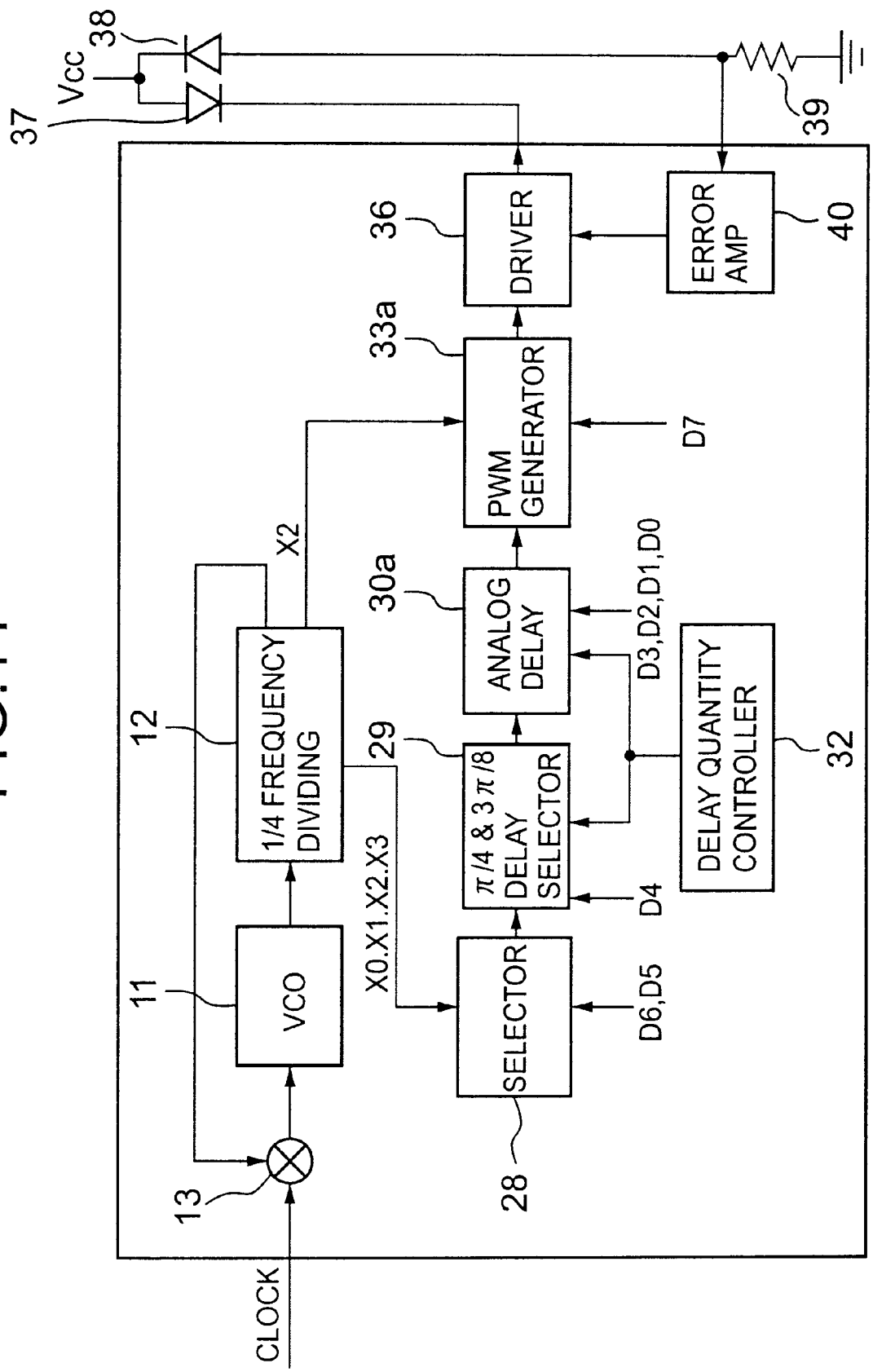
FIG. 11 is a system block diagram showing a third embodiment of the pulse width modulation circuit according to the present invention.

FIG. 11 is a system block diagram showing a third embodiment of the pulse width modulation circuit according to the present invention. In this embodiment, a laser diode (LD) driver 36 is added to a pulse width modulation circuit which includes a PLL circuit and carries out a digital delay and an analog delay, and is formed as a 1-chip integrated circuit (IC). In FIG. 11, those parts which are the same as those corresponding parts in FIGS. 1 and 9 are designated by the same reference numerals.

In this embodiment, the mode switching signal M and the position signal P of the second embodiment shown in FIG. 9 are not used. In addition, a selector 28 shown in FIG. 11 receives image data D6 and D5 in place of the data LD5, LD6, RD5 and RD6, and generates one output signal using the same logic as the second embodiment shown in FIG. 9.

A π/4 and 3π/8 delay selector 29 receives the image data D4 in place of the data LD4 and RD4, and generates one output signal using the same logic as the second embodiment shown in FIG. 9. An analog delay 30a receives the image data D0 through D3 in place of the data LD0 through LD3 received by the L-phase shifter 30 (or R-phase shifter 31), and generates one output signal using the same logic as the L-phase shifter 30 (or R-phase shifter 31). A PWM generator 33a outputs a pulse during a high-level period of the clock signal X2 when the MSB bit data D7 is "1". In other words, the PWM generator 33a generates an image modulated signal which is pulse-width-modulated, based on the pulse signal from the analog delay 30a and the clock signal X2 from the frequency dividing circuit 12.

The laser diode driver 36 includes a current driver for driving a semiconductor laser diode 37 which is used as a light source, by the output pulse signal of the PWM generator 33a. A light receiving element 38 receives the laser beam emitted from the laser diode 37, and detects the light quantity of the received laser beam. An output signal of the light receiving element 38 is detected via a resistor 39, and a voltage of the resistor 39 is compared with a reference signal (voltage) in an error amplifier 40. An output signal of the error amplifier 40 indicative of the compared result is fed back to the laser diode driver 36, so as to set the driving current of the laser diode 37. The effects obtainable by this embodiment is basically the same as those obtainable by the second embodiment shown in FIG. 9. Furthermore, because this embodiment employs the 1-chip IC structure, it is possible to realize the process from the pulse width modulation to the driving of the laser diode 37 at a high speed within the 1-chip IC. Of course, the light source is not limited to the laser diode, and similar effects are also obtainable when a light emitting diode (LED) is used as the light source.

Figure 12:
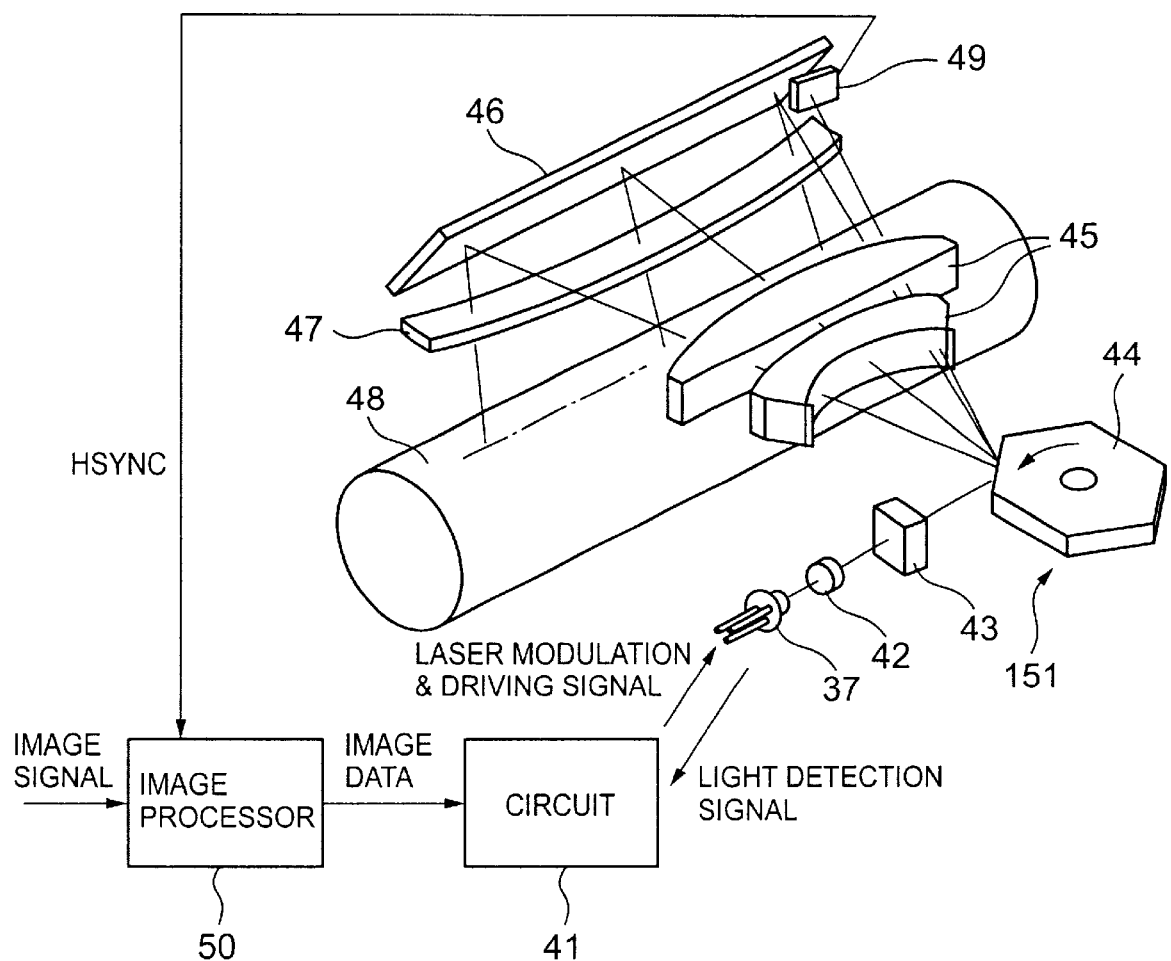
FIG. 12 is a diagram showing a first embodiment of an optical write unit according to the present invention.

FIG. 12 is a diagram showing a first embodiment of an optical write unit according to the present invention. FIG. 12 shows an optical scanning unit 151 which forms the optical write unit. This first embodiment of the optical write unit is used in a first embodiment of an image forming apparatus according to the present invention.

In FIG. 12, a PWM generating and laser diode driving circuit 41 generates a PWM pulse signal and drives a laser diode 37. For example, the laser diode 37 is modulated and driven by a laser modulating and driving signal which is received from the laser diode driver 36 within the PWM generating and laser diode driving circuit 41, and emits an optically modulated laser beam. The laser beam emitted from the laser diode 37 is supplied to a polygonal mirror 44 via a collimator lens 42 and a cylindrical lens 43. The polygonal mirror 44 is rotated by a known driving part (not shown) and functions as a scanning means for deflecting the laser beam and carrying out a scan by the deflected laser beam. The laser beam from the polygonal mirror 44 is irradiated on a photoconductive body 48 via a fθ lens 45, a reflecting mirror 46 and a toroidal lens 47. The optical scanning unit 151 described above is accommodated within an optical housing (not shown) to form the optical write unit, and the optical write unit is arranged as a single processing member with respect to the photoconductive body 48.

The photoconductive body 48 is made of a photoconductive drum, for example, and is rotated by a known driving part (not shown). An image is formed on the photoconductive body 48 by a known electrophotography technique. In other words, the photoconductive body 48 is uniformly charged, the laser beam from the toroidal lens 47 scans the photoconductive body 48 in the main scanning direction as the polygonal mirror 44 rotates and in the sub scanning direction at a predetermined timing as the photoconductive body 48 rotates, and the photoconductive body 48 is exposed to form an electrostatic latent image thereon. The electrostatic latent image on the photoconductive body 48 is developed into a toner image by a known developing unit (not shown), and the toner image is transferred onto a recording medium which is supplied in the sub scanning direction by a known transfer unit (not shown). The toner image on the recording medium is fixed by a known fixing unit (not shown).

In this case, a horizontal synchronization sensor 49 detects the laser beam from the fθ lens 45 at a scan starting side outside an image forming region. After an image processor 50 carries out a predetermined process on the image data, the processed image data are supplied to the PWM generating and laser diode driving circuit 41 in synchronism with a horizontal synchronizing signal HSYNC output from the horizontal synchronization sensor 49.

Figure 13:
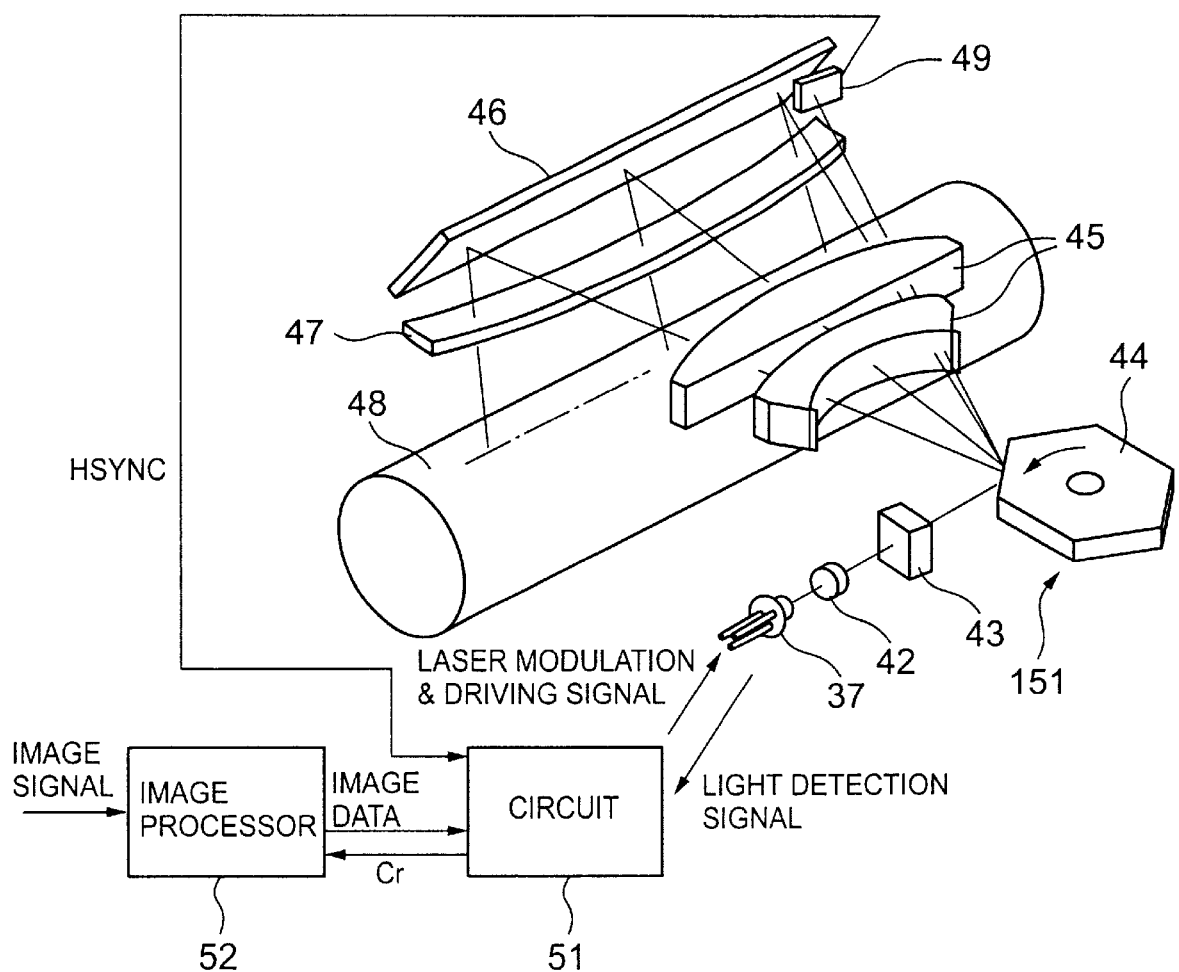
FIG. 13 is a diagram showing a second embodiment of the optical write unit according to the present invention.

FIG. 13 is a diagram showing a second embodiment of the optical write unit according to the present invention. In FIG. 13, those parts which are the same as those corresponding parts in FIG. 12 are designated by the same reference numerals, and a description thereof will be omitted. FIG. 13 shows an optical scanning unit 151 which forms the optical write unit. This second embodiment of the optical write unit is used in a second embodiment of the image forming apparatus according to the present invention. In FIG. 13, a clock generating, PWM generating and laser diode driving circuit 51 generates a clock signal Cr and a PWM pulse signal, and drives a laser diode 37.

A clock generator within the circuit 51 generates a clock signal Cr which is synchronized to the horizontal synchronizing signal HSYNC which is output from the horizontal synchronization sensor 49. This clock signal Cr from the clock generator is supplied to an image processor 52. After carrying out a predetermined process on the image data, the image processor 52 supplies the processed image data to the circuit 51 in synchronism with the clock signal Cr. The laser diode 37 is modulated and driven by a laser modulating and driving signal which is received from the laser diode driver 36 within the circuit 51, and emits an optically modulated laser beam.

Figure 14:
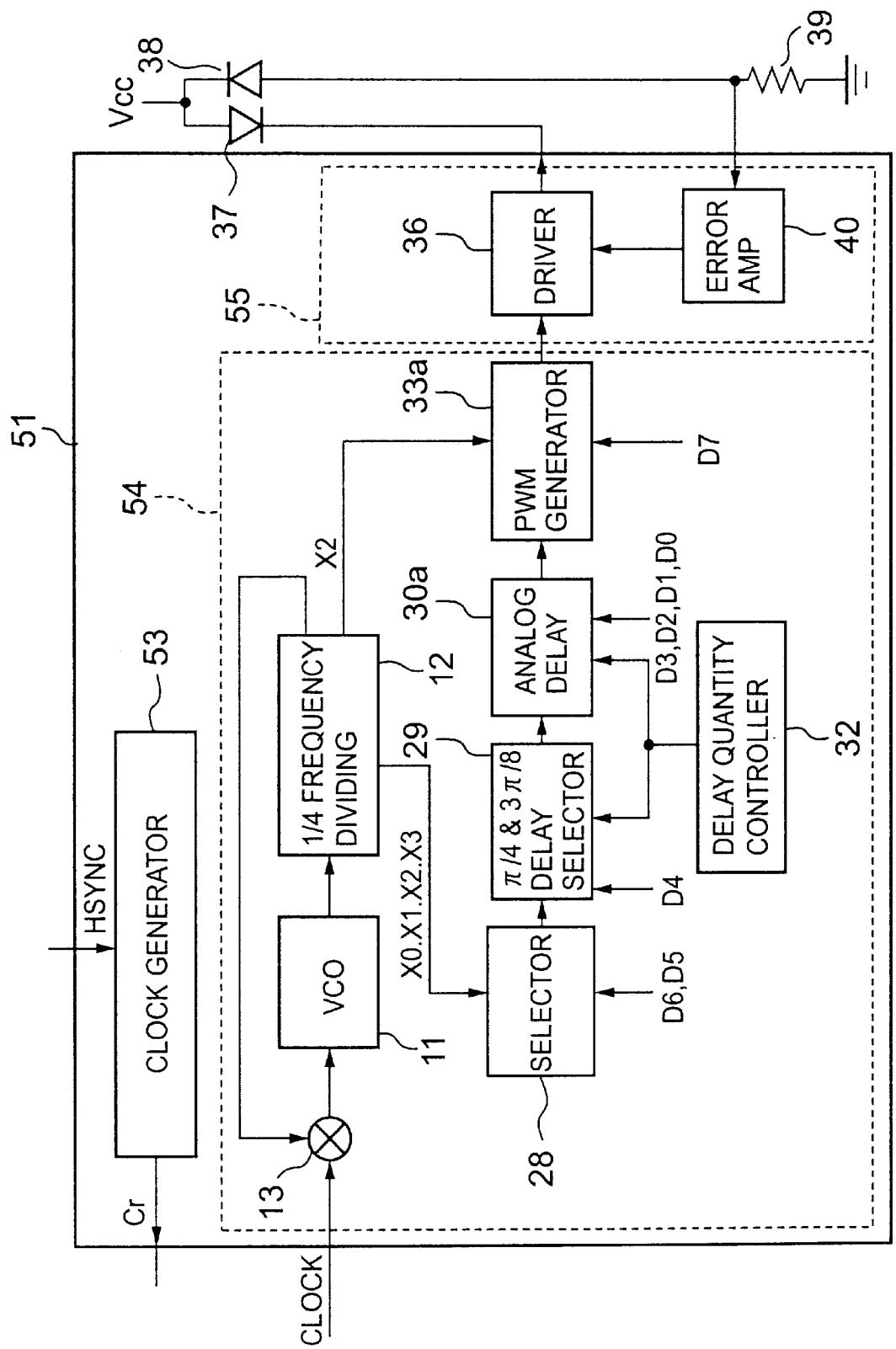
FIG. 14 is a system block diagram showing the structure of a PWM generating and laser diode driving circuit.

FIG. 14 is a system block diagram showing the structure of the circuit 51. In FIG. 14, those parts which are the same as those corresponding parts in FIG. 11 are designated by the same reference numerals, and a description thereof will be omitted. As shown in FIG. 14, the circuit 51 includes a clock generator 53, a pulse width modulator 54, and a laser diode driver 55 which are integrated into a 1-chip IC. Hence, the 1-chip IC structure of the circuit 51 realizes compact size and low cost of the image forming apparatus.

Figure 15:
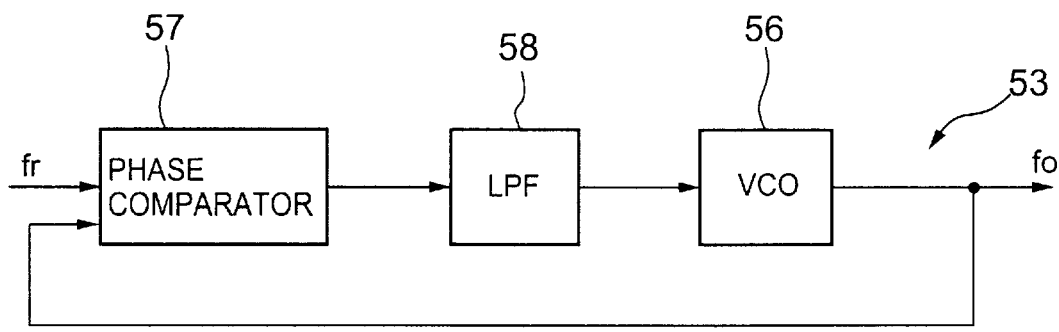
FIG. 15 is a system block diagram showing a first structure of a clock generator.

FIG. 15 is a system block diagram showing a first structure of the clock generator 53. The clock generator 53 shown in FIG. 15 includes a phase comparator 57, a lowpass filter 58 and a VCO 56 which are connected as shown. The phase comparator 57 detects a phase error or a frequency error between an input signal having a frequency fr and an output signal (clock signal Cr) of the VCO 56. An output phase error or frequency error which is output from the phase comparator 57 is integrated into a D.C. voltage by the lowpass filter 58. An oscillation frequency fo of the VCO 56 is variably controlled by the D.C. voltage from the lowpass filter 58. For example, a lag filter, a lag-lead filter, an active filter or the like may be used for the lowpass filter 58.

Figure 16:
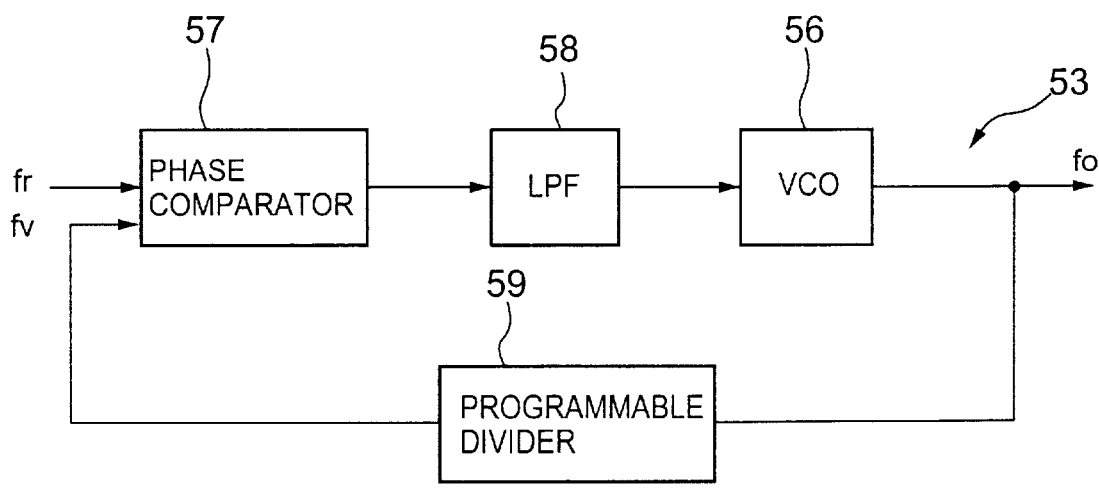
FIG. 16 is a system block diagram showing a second structure of the clock generator.

FIG. 16 is a system block diagram showing a second structure of the clock generator 53. In FIG. 16, those parts which are the same as those corresponding parts in FIG. 15 are designated by the same reference numerals, and a description thereof will be omitted.

The clock generator 53 shown in FIG. 16 additionally includes a programmable divider 59 which is inserted between the VCO 56 and the phase comparator 57, and forms a frequency synthesizer. The output signal of the VCO 56 is frequency-divided by the programmable divider 59 and supplied to the phase comparator 57. The programmable divider 59 is sometimes also referred to as an arbitrary ratio divider, and has a frequency dividing ratio which is variable by changing an internal programming thereof. If the frequency dividing ratio of the programmable divider 59 is denoted by 1/m, a relationship fr=f0/m stands when the PLL of the clock generator 53 is perfectly locked, where m is an arbitrary integer (m=1, 2, 3, . . . ). Accordingly, the oscillation frequency fo of the VCO 56 can be varied in steps of the frequency fr.

Figure 17:
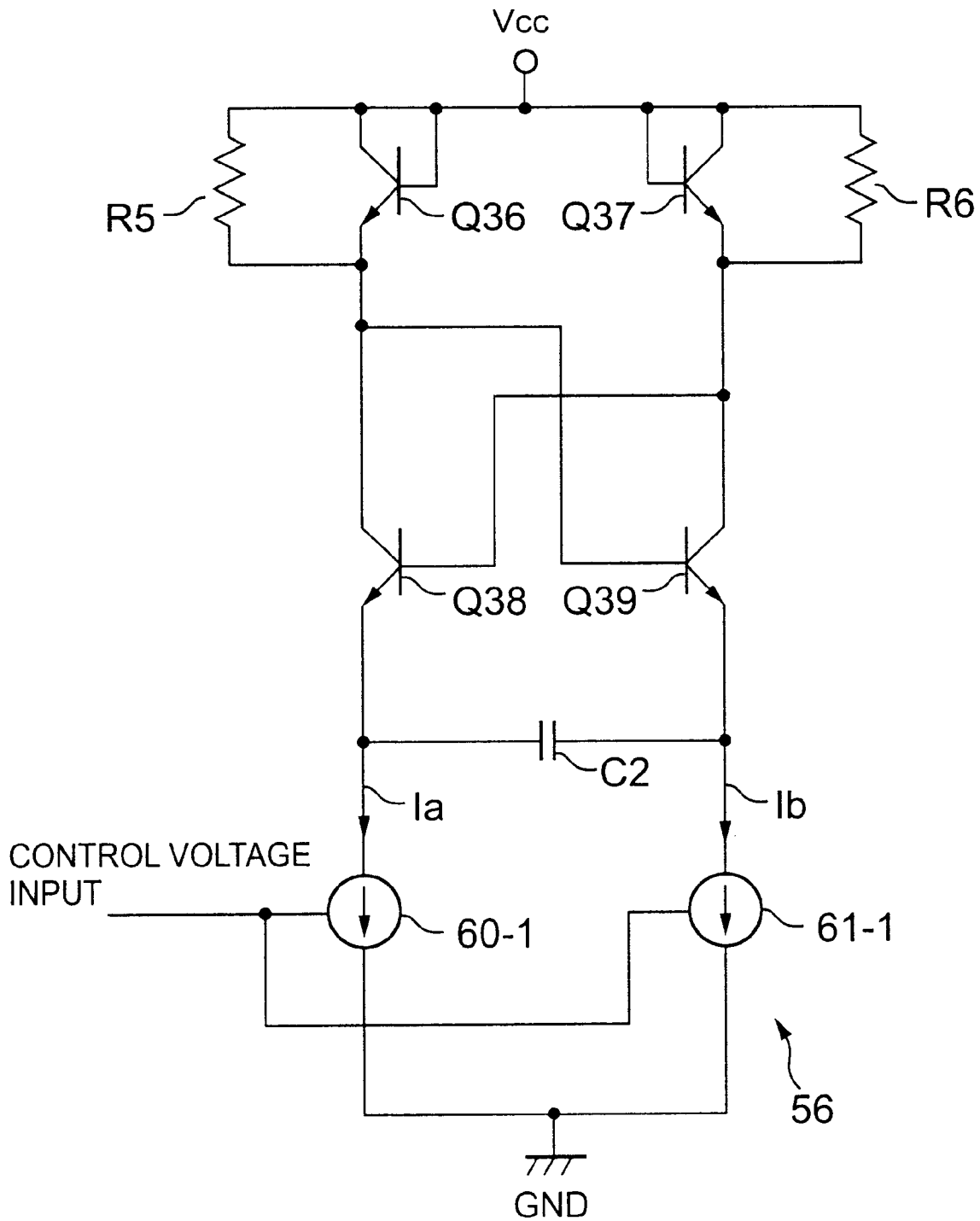
FIG. 17 is a circuit diagram showing the structure of a voltage controlled oscillator.

FIG. 17 is a circuit diagram showing the structure of the VCO 56. The VCO 56 shown in FIG. 17 is made of an emitter-coupled non-stable multivibrator. The VCO 56 includes transistors Q36 through Q39, current sources 60-1 and 61-1, resistors R5 and R6, and a capacitor C2 which are connected as shown. The oscillation frequency fo is determined approximately by the charging and discharging of the capacitor C2 by voltage control currents Ia and Ib. The voltage control currents Ia and Ib of the current sources 60-1 and 61-1 are respectively varied by a control voltage input. This multivibrator has a diode load formed by the transistors Q36 and Q37, because this multivibrator operates at a high speed. This type VCO has a linear voltage versus frequency characteristic, thereby enabling easy frequency adjustment. The output signal of the VCO 56 is obtained from the collectors of the transistors Q38 and Q39.

The VCO 56 shown in FIG. 17 uses bipolar transistors, and thus, a clock signal amplitude is on the order of 250 mV within the IC even when amplified, and is less than or equal to approximately $\frac{1}{10}$ the clock signal amplitude in the case of a CMOS circuit (for example, approximately 5V or 3.5 V across a power source and ground). Similarly, in terms of the energy quantity, the energy quantity for the case where the bipolar transistors are used is also less than or equal to approximately $\frac{1}{10}$ that for the case where the CMOS circuit is used. Therefore, it is evident that the use of the bipolar transistors in the 1-chip IC as shown in FIG. 17 is advantageous in relation to the electromagnetic interference (EMI) and the like.

Figure 18:
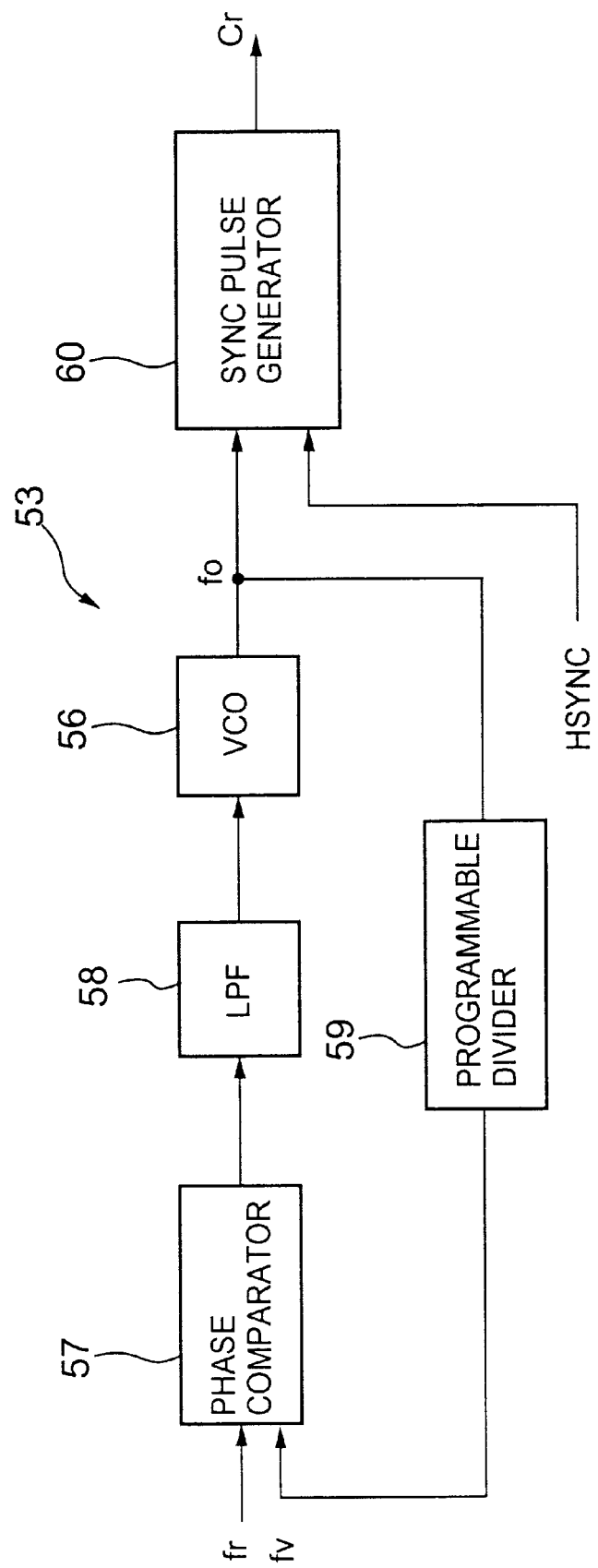
FIG. 18 is a system block diagram showing a third structure of the clock generator.

FIG. 18 is a system block diagram showing a third structure of the clock generator 53. In FIG. 18, those parts which are the same as those corresponding parts in FIG. 16 are designated by the same reference numerals, and a description thereof will be omitted. The clock generator 53 shown in FIG. 18 generates a clock signal Cr which is synchronized to the horizontal synchronizing signal HSYNC which is obtained from the horizontal synchronization sensor 49 which functions as a scanning light detecting means.

In FIG. 18, the frequency synthesizer described above in conjunction with FIG. 16, which is formed by the VCO 56, the phase comparator 57, the lowpass filter 58 and the programmable divider 59, generates a frequency-multiplied clock signal having the frequency fo in response to the reference clock signal having the frequency fr. A synchronization pulse generator 60 frequency-divides the clock signal (fo) from the VCO 56 so as to generate a plurality of clock signals (pulse signals) Cr having the same frequency fr but having mutually different phases. One of the clock signals Cr is selected by the horizontal synchronizing signal HSYNC, and output as a clock signal which has a desired frequency and is synchronized to the horizontal synchronizing signal HSYNC.

According to the first and second embodiments of the optical write unit shown in FIGS. 12 and 13 and the first and second embodiments of the image forming apparatus which respectively use the optical write units shown in FIGS. 12 and 13, a pulse width modulation is carried out based on input digital multi-level image data (input digital data), and an image modulated signal drives a light source such as the laser diode 37. The light from the light source is supplied to the polygonal mirror 44 which forms a scanning means so as to scan the photoconductor body 48 to form an electrostatic latent image thereon. An image corresponding to the electrostatic latent image is formed on the recording medium. In the image forming apparatus or, the optical write unit, a pulse width modulation circuit includes signal generating means for generating a reference clock signal and a signal approximately inversely proportional to the input digital multi-level image data, delay quantity generating means for delaying the reference clock signal by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from a pulse signal from the delay quantity generating means and the reference clock signal. The pulse width modulation circuit is included in the PWM generating and laser diode driving circuit 41 or, the clock generating, PWM generating and laser diode driving circuit 51. Therefore, even if the operation speed is high, it is possible to realize a high gradation representation of the image by use of a high-speed analog delay circuit.

In addition, according to the first and second embodiments of the optical write unit shown in FIGS. 12 and 13 and the first and second embodiments of the image forming apparatus which respectively use the optical write units shown in FIGS. 12 and 13, a pulse width modulation is carried out based on input digital multi-level image data (input digital data), and an image modulated signal drives a light source such as the laser diode 37. The light from the light source is supplied to the polygonal mirror 44 which forms a scanning means so as to scan the photoconductor body 48 to form an electrostatic latent image thereon. An image corresponding to the electrostatic latent image is formed on the recording medium. In the image forming apparatus or, the optical write unit, a pulse width modulation circuit includes first signal generating means for generating a high-frequency clock signal which is synchronized to a reference clock signal by frequency-multiplying the reference clock signal, and generating a plurality of pulse signals (clock signals) having mutually different phases based on the high-frequency clock signal, pulse selecting means for selecting the plurality of pulse signals based on upper bit data of the input digital multi-level image data synchronized to the reference clock signal, second signal generating means for generating a signal which is approximately inversely proportional to lower bit data of the input digital multi-level image data, delay quantity generating means for delaying the pulse signal from the pulse selecting means by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from the pulse signal from the delay quantity generating means and one of the pulse signals. The pulse width modulation circuit is included in the PWM generating and laser diode driving circuit 41 or, the clock generating, PWM generating and laser diode driving circuit 51. Therefore, even if the operation speed is high, it is possible to realize a high gradation representation of the image by use of a combination of a high-speed analog delay circuit and a digital delay circuit.

Furthermore, according to the second embodiment of the optical write unit shown in FIG. 13 and the second embodiment of the image forming apparatus, a light source driver drives the light source by the image modulated signal from the modulated signal generating means, scanning light detecting means detects the scanning light from the scanning means at a predetermined position, and a clock generator generates a clock in synchronism with a detection signal from the scanning light detecting means. The light source driver may be formed by the laser diode driver 36, the scanning light detecting means may be formed by the horizontal synchronization sensor 49, and the clock generator may be formed by the clock generator 53. The clock generator, the light source driver and the pulse width modulation circuit may be formed by a 1-chip IC, such as the 1-chip IC 51. In this case, the 1-chip IC is stable with respect to the effects of EMI, and the size, cost and power consumption can all be reduced.

Figure 19:
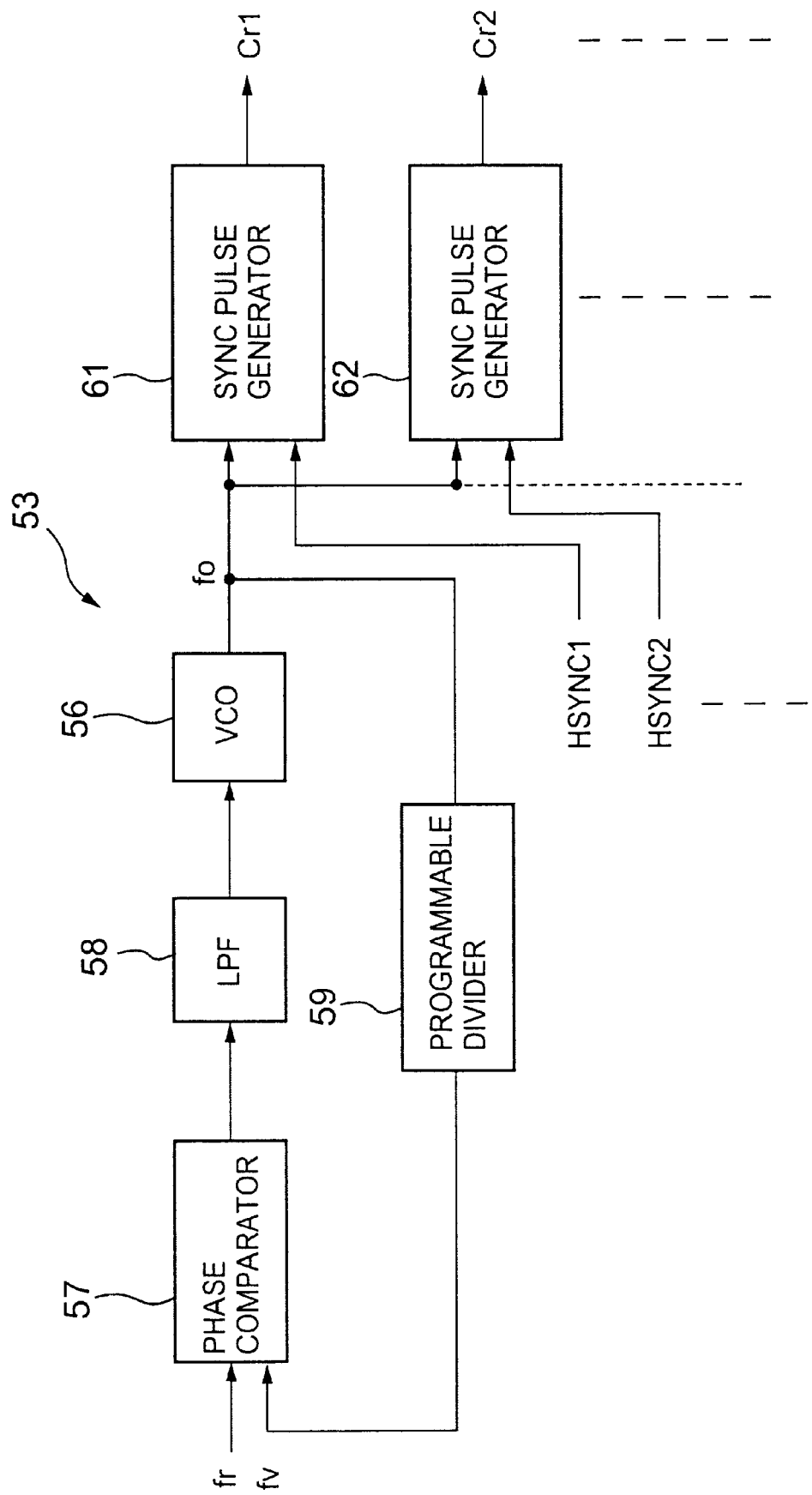
FIG. 19 is a system block diagram showing a fourth structure of the clock generator.

FIG. 19 is a system block diagram showing a fourth structure of the clock generator 53. In FIG. 19, those parts which are the same as those corresponding parts in FIG. 18 are designated by the same reference numerals, and a description thereof will be omitted.

The clock generator 53 shown in FIG. 19 includes a plurality of synchronization pulse generators 61, 62, . . . . Each of the synchronization pulse generators 61, 62, . . . frequency-divides the frequency-multiplied clock signal generated by the frequency synthesizer (56, 57, 58 and 59), so as to generate a plurality of clock signals (pulse signals) having the same frequency fr but mutually different phases at each of the synchronization pulse generators 61, 62, . . . . Of the plurality of clock signals, one clock pulse is selected responsive to a corresponding horizontal synchronizing signal. In this particular case, a clock signal Cr1 is selected and output from the synchronization pulse generator 61 in response to a horizontal synchronizing signal HSYNC1, a clock signal Cr2 is selected and output from the synchronization pulse generator 62 in response to a horizontal synchronizing signal HSYNC2, . . . . Hence, the synchronization pulse generators 61, 62, . . . generate the clock signals Cr1, Cr2, . . . which are synchronized to the corresponding horizontal synchronizing signals HSYNC1, HSYNC2, . . . and have the desired frequency.

In a case where the optical scanning unit scans the photoconductive body 48 using a plurality of laser beams, the horizontal synchronization sensor 49 detects the plurality of laser beams at the scan starting side outside the image forming region and generates the horizontal synchronizing signals HSYNC1, HSYNC2, . . . .

Figure 20:
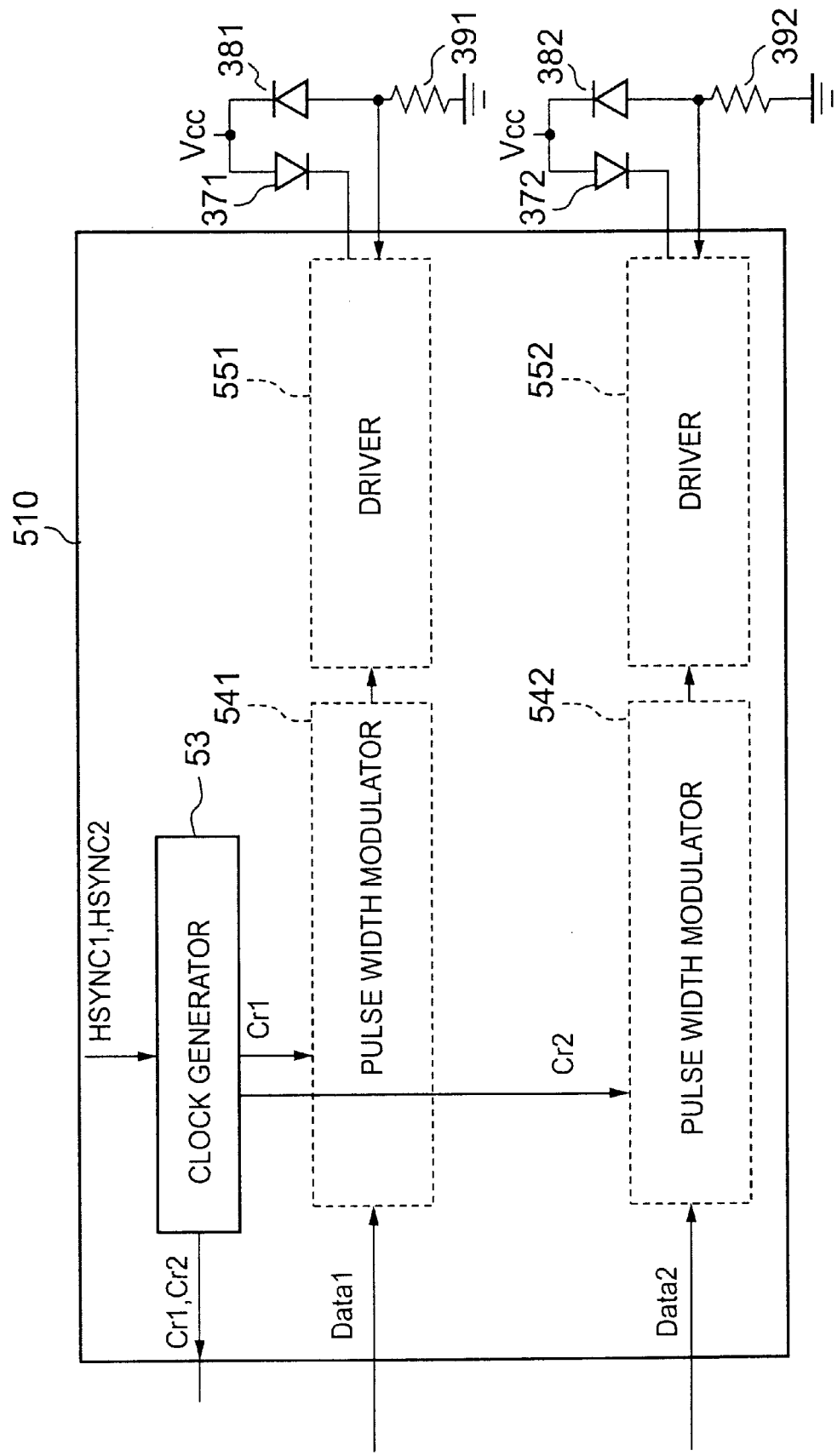
FIG. 20 is a diagram showing the structure of an integrated circuit which may be used in the second embodiment of the optical write unit.

FIG. 20 is a diagram showing the structure of an integrated circuit 510 which may be used in place of the circuit 51 in the second embodiment of the optical write unit. In this case, it is assumed for the sake of convenience that the optical scanning unit 151 shown in FIG. 13 scans the photoconductor body 48 by a plurality of laser beams emitted from a plurality of laser diodes 37, and that the horizontal synchronization sensor 49 detects the plurality of laser beams at the scan starting side outside the image forming region to generate the horizontal synchronizing signals HSYNC1, HSYNC2, . . . . In addition, it is assumed that a plurality of synchronization pulse generators are provided. For the sake of convenience, FIG. 20 shows a case where two synchronization pulse generators are provided within the integrated circuit 510.

Hence, the optical scanning unit 151 includes two laser diodes 371 and 372 shown in FIG. 20 as light sources. The laser beams emitted from the laser diodes 371 and 372 are deflected by the polygonal mirror 44 via the collimator lens 43 and the like, and scan the photoconductive body 48 via the fθ lens 45 and the like, to form an electrostatic latent image by exposing the photoconductive body 48. The horizontal synchronization sensor 49 detects the laser beams at the scan starting side outside the image forming region, and generates the horizontal synchronizing signals HSYNC1 and HSYNC2.

The laser diodes 371 and 372 are respectively driven by laser diode drivers 551 and 552. Light receiving elements 381 and 382 respectively receive the laser beams emitted from the laser diodes 371 and 372, and detect the light quantities thereof. Output signals of the light receiving elements 381 and 382 are respectively detected via resistors 391 and 392, and voltages of the resistors 391 and 392 are respectively input to the laser diode drivers 551 and 552. Pulse width modulators 541 and 542 and the laser diode drivers 551 and 552 are constructed similarly to the pulse width modulator 54 and the laser diode driver 55 shown in FIG. 14. The pulse width modulators 541 and 542 respectively receive data data1 and data2 of the digital multi-level image data for modulating the laser diodes 371 and 372.

The clock generator 53 generates clocks (write pulses) Cr1 and Cr2 which are respectively synchronized to the horizontal synchronizing signals HSYNC1 and HSYNC2 from the horizontal synchronization sensor 49. The clocks Cr1 and Cr2 have the same frequency. In other words, only one clock generator 53 is required when simultaneously modulating the plurality of laser diodes 371 and 372. Hence, when constructing the integrated circuit 510 to drive the plurality of laser diodes 371 and 372, the clock generator 53 such as that shown in FIG. 19 can be integrated into a 1-chip IC using bipolar transistors, together with the laser diode driver and the pulse width modulator. In this case, the provision of a single high-frequency oscillator and the use of the bipolar transistors in the integrated circuit 510 enables a stable operation with respect to the effects of EMI, and the size, cost and power consumption of the image forming apparatus using the integrated circuit 510 can all be reduced.

In this embodiment, anode-common type laser diodes are used for the light sources, that is, the laser diodes 371 and 372, but it is of course possible to use cathode-common type laser diodes. In addition, since the integrated circuit 510 is capable of simultaneously driving a plurality of light sources and carrying out the pulse width modulation, similar effects can be obtained by the image forming apparatus using LEDs as the light sources. Therefore, this embodiment can obtain effects similar to those obtainable by the embodiments shown in FIGS. 12 and 13.

Figure 21:
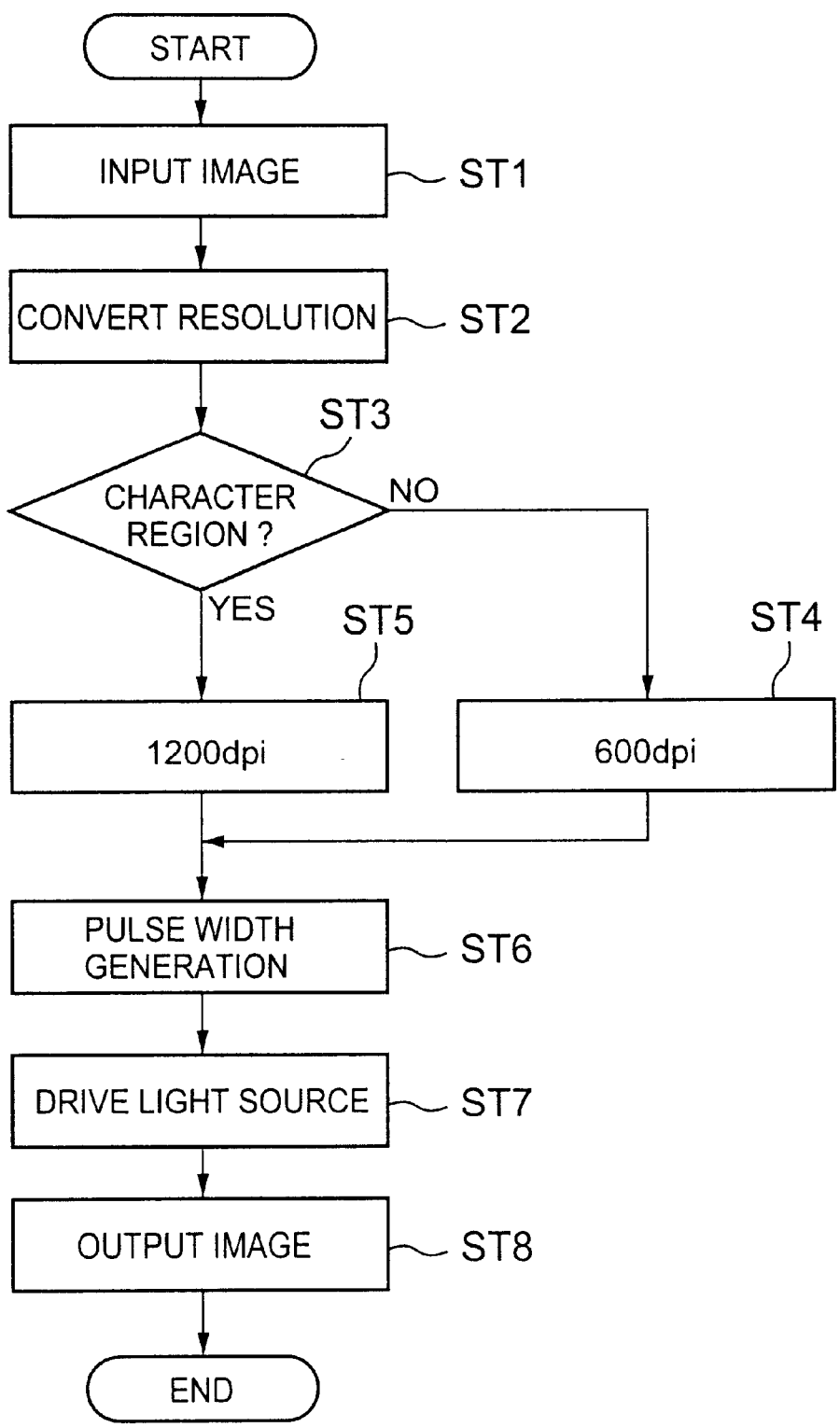
FIG. 21 is a flow chart for explaining the image processing of a third embodiment of the image forming apparatus according to the present invention.

FIG. 21 is a flow chart for explaining the image processing of a third embodiment of the image forming apparatus according to the present invention, from the input of the image to the output of the image.

In FIG. 21, a step ST1 inputs the input digital multi-level image data, and a step ST2 converts the resolution of the image data. A step ST3 decides whether or not a processing part of the image data relates to a character region which is made up of characters. If the decision result in the step ST3 is NO, a step ST4 sets the write density to 600 dpi in the main scanning direction, which corresponds to the normal mode. On the other hand, if the decision result in the step ST3 is YES, a step ST5 sets the write density to 1200 dpi in the main scanning direction, which corresponds to high-speed (double-speed) mode. After the step ST4 or ST5, a step ST6 carries out a pulse width modulation by generating a pulse width depending on the set write density. A step ST7 drives the light source, that is, the semiconductor laser, by the image modulated signal (pulse modulated signal). A step ST8 outputs the image by forming the image based on the light emitted from the light source.

Figure 22:
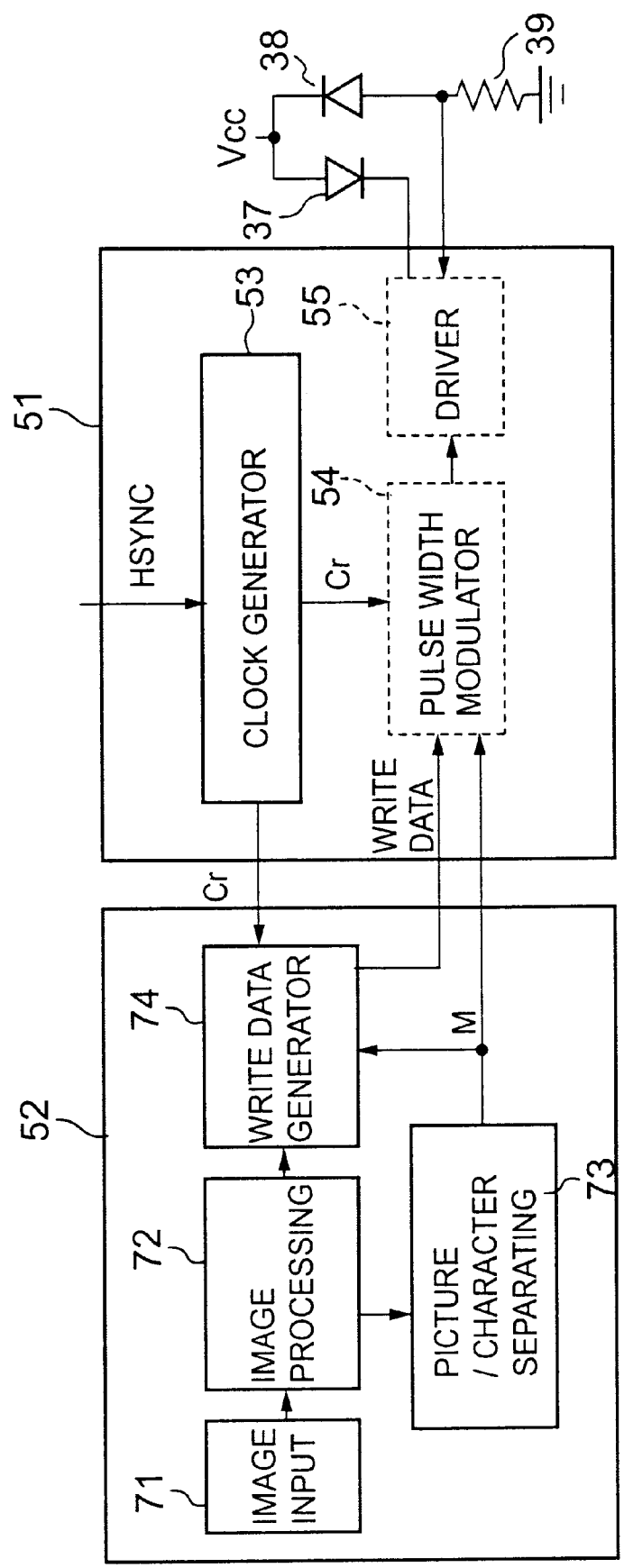
FIG. 22 is a system block diagram showing a part of the third embodiment of the image forming apparatus.

FIG. 22 is a system block diagram showing a part of the third embodiment of the image forming apparatus which carries out the image processing shown in FIG. 21. In FIG. 22, those parts which are the same as those corresponding parts in FIG. 14 are designated by the same reference numerals, and a description thereof will be omitted.

This embodiment of the image forming apparatus differs from the embodiments described above in the following respects. That is, the input digital multi-level image data may be received from a computer or an image input unit 71 such as a copying machine. Normally, the resolution of the input image data and the resolution of the image formed on the recording medium are different, and thus, an image processing unit 72 is provided to convert the resolution of the input digital multi-level image data into the resolution of the image which is to be formed on the recording medium.

As shown in FIG. 22, the image processor 52 includes the image input unit 71, the image processing unit 72, a picture/image separating unit 73, and a write data generator 74. The picture/image separating unit 73 separates the image indicated by the input digital multi-level image data into a picture region which is made up of one or more pictures or photographs, and a character region which is made up of characters. Generally, when forming an image on the recording medium, it is possible to obtain a sharper image of the characters if the write density is high even when the number of gradation levels is small. On the other hand, if the number of gradation levels is small and the write density is high, the image of the pictures lacks smoothness. Hence, in the case of the pictures, it is possible to obtain a smoother image having a higher fidelity with respect to the original image if the write density is low and the number of gradation levels is large.

Accordingly, the picture/character separating unit 73 separates the image data received from the image processing unit 72 into the picture region and the character region, and outputs a character region signal of the character region to the write data generator 74. In addition, the picture/character separating unit 73 switches the mode switching signal M in synchronism with a reference clock signal, depending on the picture region and the character region of the image data. The write data generator 74 switches the character region signal from the picture/character separating unit 73 depending on the picture region and the character region of the image data received from the image processing unit 72 in synchronism with this reference clock signal, and outputs write data to the pulse width modulator 54 in synchronism with the clock signal Cr from the clock generator 53. The mode switching signal M is also supplied to the pulse width modulator 54 as a write density switching signal.

For example, in a case where the character region of the image data is separated, the picture/character separating unit 73 sets the mode switching signal M to a low level, so that the pulse width modulator 54 carries out the pulse width modulation in the high-speed (double-speed) mode. On the other hand, in a case where the picture region of the image data is separated, the picture/character separating unit 73 sets the mode switching signal M to a high level, so that the pulse width modulator 54 carries out the pulse width modulation in the normal mode. In this embodiment, the pulse width modulator 54 has the structure shown in FIG. 9. Hence, when outputting the character region, the write density in the main scanning direction is doubled compared to that during the normal mode. In other words, compared to the write density of 600 dpi in the normal mode, the write density is doubled to 1200 dpi.

In the case of an 8-bit input image data, the image data is output with an 8-bit gradation level when outputting the picture region, and the image data is output with a 4-bit gradation level in parallel as an 8-bit data in total when outputting the character region. If the write density in the main scanning direction during the normal mode is 600 dpi, the 8-bit pulse width modulation representation represents 256 gradation levels per dot with the write density of 600 dpi in the main scanning direction during the normal mode in which the picture region of the image data is output. On the other hand, the 4-bit pulse width modulation representation represents 16 gradation levels per dot with the write density of 1200 dpi in the main scanning direction during the high-speed (double-speed) mode in which the character region of the image data is output. Hence, such 8-bit pulse width modulation representation and 4-bit pulse with modulation representation can be can be realized without changing the write clock.

In FIG. 21, the steps ST4 and ST5 respectively set the write density to 600 dpi in the main scanning direction when outputting the region other than the character region of the image data and to 1200 dpi in the main scanning direction when outputting the character region of the image data. However, the write densities are of course not limited to such. In other words, when carrying out the pulse width modulation, it is possible to switch the write density in the main scanning direction to two times or one-half between the cases where the character region is output and the region other than the character region is output.

According to this embodiment, it is possible to obtain effects similar to those obtainable by the embodiments shown in FIGS. 12 and 13. In addition, this embodiment of the image forming apparatus, a pulse width modulation is carried out based on input digital multi-level image data (input digital data), and an image modulated signal drives a light source such as the laser diode 37. The light from the light source is supplied to the polygonal mirror 44 which forms a scanning means so as to scan the photoconductor body 48 to form an electrostatic latent image thereon. An image corresponding to the electrostatic latent image is formed on the recording medium. The image forming apparatus includes the circuit 51, the picture/character separating unit 73, and the write data generator 74. The circuit 51 includes signal generating means for generating a reference clock signal and a signal approximately inversely proportional to the input digital multi-level image data, delay quantity generating means for delaying the reference clock signal by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from a pulse signal from the delay quantity generating means and the reference clock signal. The picture/character separating unit 73 functions as character region recognizing means for recognizing the character region of the digital multi-level image data. The write data generator 74 functions as write data generating means for generating the write data based on the character region signal obtained from the character region recognizing means. Based on the character region signal, the pulse width modulation is carried out with respect to the non-character region other than the character region by setting the period of the reference clock signal as corresponding to one pixel, and the pulse width modulation is carried out with respect to the character region by setting one-half the period of the reference clock signal as corresponding to one pixel. As a result, a sharper image is obtained for the character region, and a smooth image having a high fidelity with respect to the original image is obtained for the non-character region.

In addition, according to this embodiment of the image forming apparatus, a pulse width modulation is carried out based on input digital multi-level image data (input digital data), and an image modulated signal drives a light source such as the laser diode 37. The light from the light source is supplied to the polygonal mirror 44 which forms a scanning means so as to scan the photoconductor body 48 to form an electrostatic latent image thereon. An image corresponding to the electrostatic latent image is formed on the recording medium. The image forming apparatus includes the circuit 51, the picture/character separating unit 73, and the write data generator 74. The circuit 51 includes first signal generating means for generating a high-frequency clock signal which is synchronized to a reference clock signal by frequency-multiplying the reference clock signal, and generating a plurality of pulse signals (clock signals) having mutually different phases based on the high-frequency clock signal, pulse selecting means for selecting the plurality of pulse signals based on upper bit data of the input digital multi-level image data synchronized to the reference clock signal, second signal generating means for generating a signal which is approximately inversely proportional to lower bit data of the input digital multi-level image data, delay quantity generating means for delaying the pulse signal from the pulse selecting means by a desired phase delay based on the signal which is approximately inversely proportional to the input digital multi-level image data, delay quantity control means for controlling a delay quantity of the delay quantity generating means, and modulated signal generating means for generating an image modulated signal which is pulse-width-modulated from the pulse signal from the delay quantity generating means and one of the pulse signals. The picture/character separating unit 73 functions as character region recognizing means for recognizing the character region of the digital multi-level image data. The write data generator 74 functions as write data generating means for generating the write data based on the character region signal obtained from the character region recognizing means. Based on the character region signal, the pulse width modulation is carried out with respect to the non-character region other than the character region by setting the period of the reference clock signal to one pixel, and the pulse width modulation is carried out with respect to the character region by setting one-half the period of the reference clock signal to one pixel. As a result, a sharper image is obtained for the character region, and a smooth image having a high fidelity with respect to the original image is obtained for the non-character region.

Figure 23A:
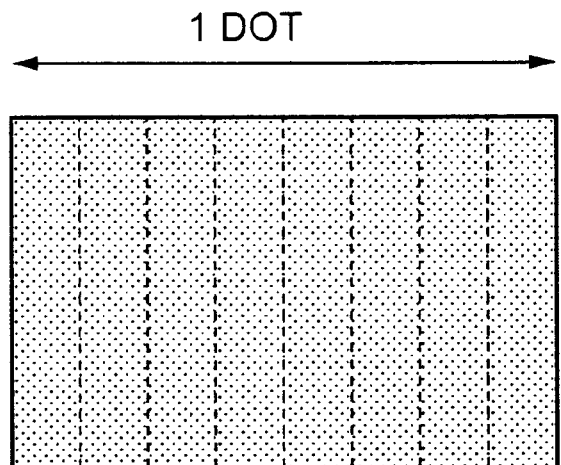
FIGS. 23A, 23B and 23C are diagrams for explaining a fourth embodiment of the pulse width modulation circuit according to the present invention.
Figure 23B:
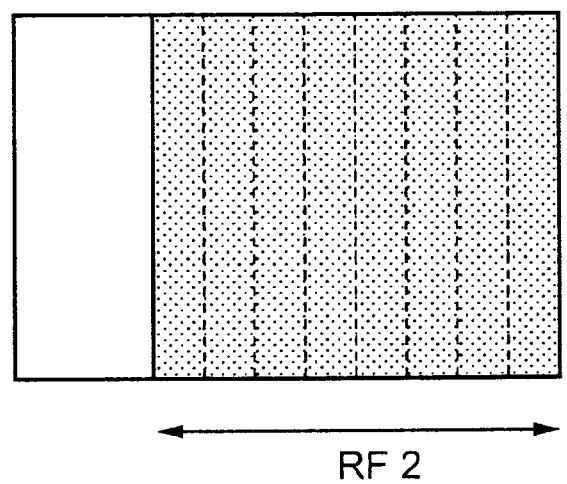
Figure 23C:
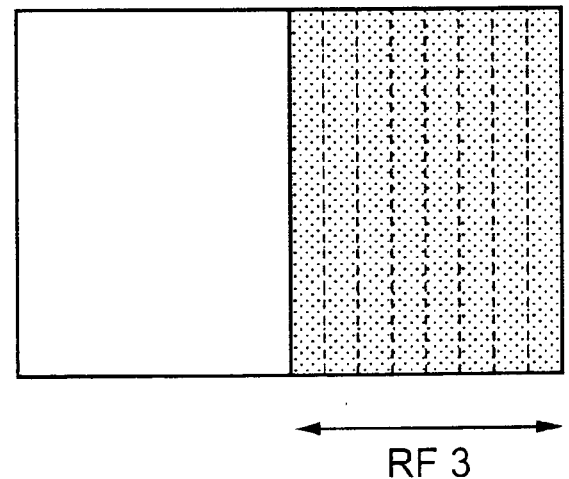

FIGS. 23A, 23B and 23C are diagrams for explaining a fourth embodiment of the pulse width modulation circuit according to the present invention. In the delay quantity controller 16 of the embodiments described above, the delay quantity is controlled based on the clock signal X0 or *X0, as described above in conjunction with FIGS. 6 and 7. Hence, with reference to the clock signal X0 or *X0 having the period T, the delay quantity can freely be set to T, T/2, T/3, T/4, and the like, for example. With respect to such a delay quantity, it is possible to generate a 3-bit pulse width, for example, and outputs such as those shown in FIGS. 23A through 23C can be obtained. In FIGS. 23A through 23C, it is assumed for the sake of convenience that the pulse width modulation is carried out with 3 bits (8 values), and the period T is taken as one dot of the image. FIG. 23A shows the dot image for a case where the 3-bit pulse width modulation is carried out with a reference time width, that is, a full-scale time T (=delay reference value RF1). FIG. 23B shows the dot image for a case where the 3-bit pulse width modulation is carried out with a reference time width, that is, a full-scale time 3T/4 (=delay reference value RF2). FIG. 23C shows the dot image for a case where the 3-bit pulse width modulation is carried out with a reference time width, that is, a full-scale time T/2 (=delay reference value RF3).

The high-speed pulse width generation is possible even when the reference time width, that is, the full-scale time, is changed as described above within a range of the period T or less, and thus, a satisfactory gradation representation can be maintained. For example, the full-scale time may be set to the period T when carrying out the pulse width modulation with respect to the character region of the image, and the full-scale time may be set to less than the period T when carrying out the pulse width modulation with respect to the picture region of the image. By taking such measures, the density of the pulse width modulation becomes variable, and the gradation representation in a highlighted (or bright) portion of the image can be improved, so that it is possible to realize an image forming apparatus having a high-speed and high-resolution optical write unit.

Although the pulse width is generated so that the dot is aligned to the right within one dot in the cases shown in FIGS. 23A through 23C, it is of course possible to align the dot to the left or the center within one dot and obtain similar effects.

Therefore, by forming the signal generating means by the D/A converter circuit 125 and the division circuit 121 shown in FIG. 8, for example, it is possible to carry out a high-speed pulse width generation, and to realize a high-resolution pulse width modulation circuit in which the gradation representation does not deteriorate, by setting the full-scale time with which the pulse width modulation is carried out to less than the period T of the reference clock signal. Particularly, by freely switching the full-scale time of the pulse width modulation between the period T of the reference clock signal and less than the period T, it is possible to realize a high-resolution pulse width modulation circuit in which the gradation representation does not deteriorate regardless of the image data to be modulated. In other words, an image forming apparatus which uses the pulse width modulation circuit can switch between the output of the dark portion or the character region of the image, and the output of the highlighted (or bright) portion or the picture region of the image, and the high resolution can be realized without deteriorating the sharpness in the highlighted portion or the picture region and without deteriorating the gradation representation in the dark portion or the character region.

FIG. 24 is a system block diagram showing a fifth embodiment of the pulse width modulation circuit according to the present invention. In FIG. 24, those parts which are the same as those corresponding parts in FIGS. 1, 7 and 8 are designated by the same reference numerals, and a description thereof will be omitted.

In FIG. 24, the image data is supplied to a delay 15 having the structure shown in FIG. 8. The delay 15 instantaneously outputs a delay quantity generating current which is supplied to a delay quantity generator 101 which generates a delayed pulse signal which is controlled of the delay quantity. The delayed pulse signal is subjected to a logical sum or a logical product operation with respect to the reference clock signal, so that a modulated pulse signal is output from pulse width generator 17.

When the reference clock signal has a relatively low frequency, this embodiment shown in FIG. 24 can generate a sufficiently accurate modulated pulse signal. However, as the frequency of the reference clock signal becomes high, there is an inevitable time delay even though the delay 15 instantaneously generates the delay quantity generating current, and it becomes more difficult to accurately generate the modulated pulse signal.

Figure 25:
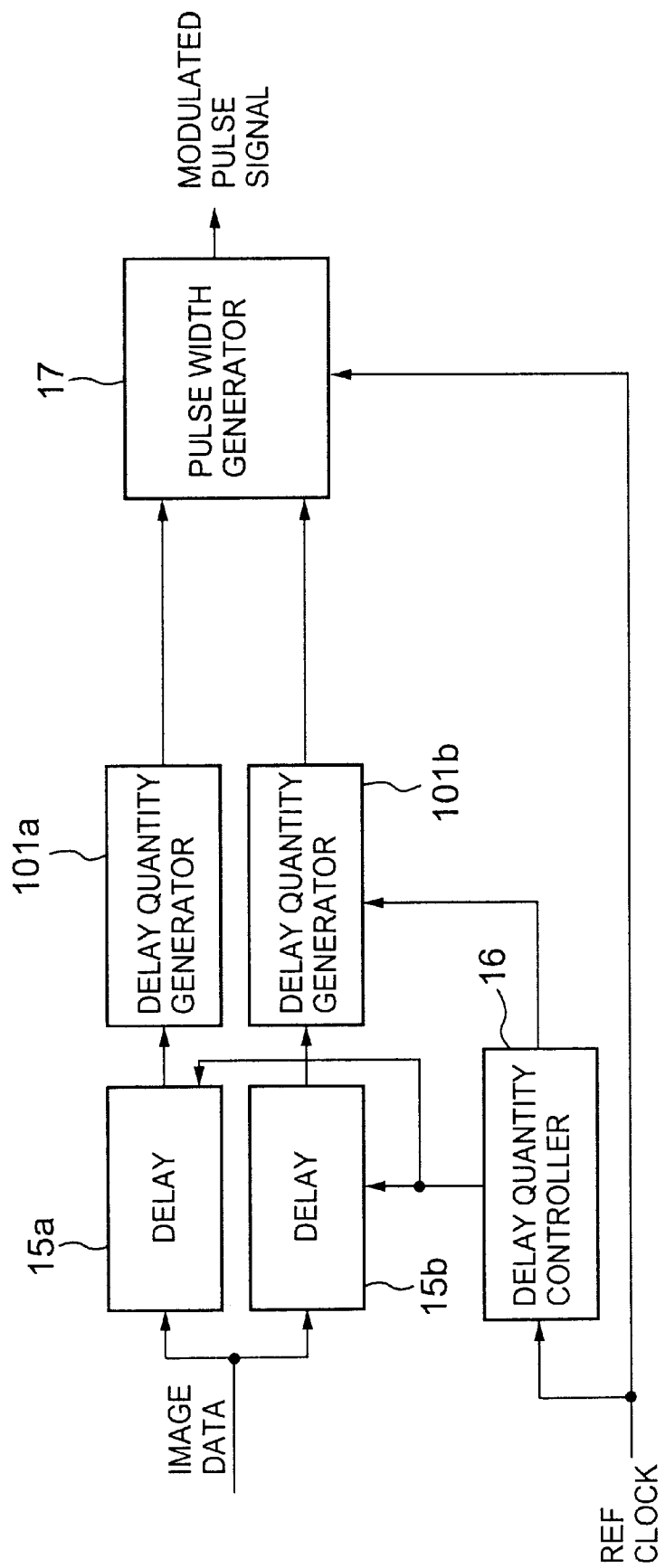
FIG. 25 is a system block diagram showing a sixth embodiment of the pulse width modulation circuit according to the present invention.

FIG. 25 is a system block diagram showing a sixth embodiment of the pulse width modulation circuit according to the present invention. In FIG. 25, those parts which are the same as those corresponding parts in FIG. 24 are designated by the same reference numerals, and a description thereof will be omitted.

In FIG. 25, two systems are provided to eliminate the difficulty encountered in the embodiment shown in FIG. 24 even when the frequency of the reference clock signal becomes high. More particularly, a first system includes a delay 15a and a delay quantity generator 101a, and a second system includes a delay 15b and a delay quantity generator 101b.

In the case of an optical write operation in a printer, for example, the modulated pulse generation for a certain dot is carried out by the first system including the delay 15a and the delay quantity generator 101a, the modulated pulse generation for a dot next to the certain dot is carried out by the second system including the delay 15b and the delay quantity generator 101b, the modulated pulse generation for the next dot is carried out by the first system, and so on. By generating the modulated pulses alternately (in a toggle manner) by the first and second systems, the delay quantity generating current generated by the delay 15 has a margin in the set-up and hold time amounting to the time in which the modulated pulse generation is carried out with respect to the previous dot. As a result, it is possible to generate a highly accurate modulated pulse signal even when the frequency of the reference clock signal becomes high.

Although this embodiment shown in FIG. 25 is provided with two systems, it is possible to provide more than two systems of the delay and delay quantity generator as the frequency of the reference clock signal further increases, so that a highly accurate modulated pulse signal can be generated regardless of the frequency of the reference clock signal.

Figure 26A:
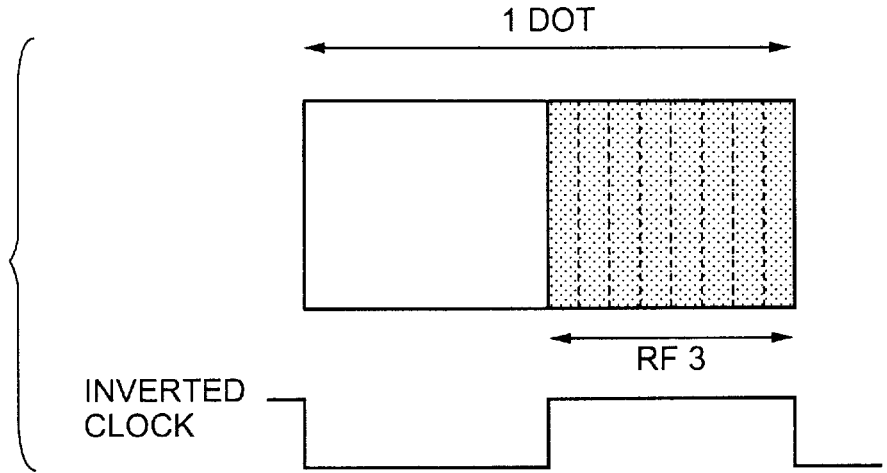
FIGS. 26A and 26B are diagrams for explaining a seventh embodiment of the pulse width modulation circuit according to the present invention.
Figure 26B:
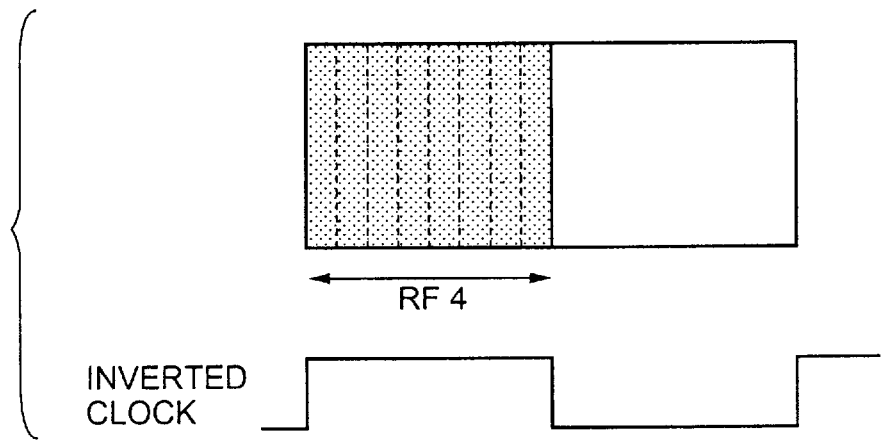

FIGS. 26A and 26B are diagrams for explaining a seventh embodiment of the pulse width modulation circuit according to the present invention.

FIG. 26A shows a case where a delay reference value RF3 is generated using an inverted clock signal of the reference clock signal (for example, X0) which determines one dot. FIG. 26B shows a case where a delay reference value RF4 is generated using a non-inverted clock signal of the reference clock signal (for example, X0) which determines one dot. When the reference clock signal has a duty cycle of 50%, for example, it is possible to select whether the pulse width modulation is to be carried out from the right or left within one dot depending on which one of the inverted and non-inverted clock signal is to be used, as may be seen from FIGS. 26A and 26B. Since it is possible to shift the phase of the dot which is written, this embodiment can realize a pulse width modulation having a further improved resolution with respect to the main scanning direction.

When controlling the writing phase within one dot in a structure provided with a digital delay circuit using a PLL circuit or the like as shown in FIG. 1, for example, it is possible to select one of the plurality of clock signals (pulse signals) X0 X1, X2 and X3 or inverted signals *X0 *X1, *X2 and *X3 thereof for use as a reference for controlling the writing phase. Hence, it is also possible to select the write phase within one dot to a position near the center within one dot.

Further, the present invention is not limited to these embodiments, but various variations and modifications may be made without departing from the scope of the present invention.

What is claimed is:

1. A pulse width modulation circuit comprising:

signal generating means for generating a reference clock signal and a predetermined signal which is approximately inversely proportional to a digital data input signal;

delay quantity generating means for delaying the reference clock signal by a desired phase delay to output a pulse signal, based on the predetermined signal from said signal generating means;

delay quantity control means for controlling a delay quantity of said delay quantity generating means; and modulated signal generating means for generating a modulated signal which is pulse-width-modulated based on the pulse signal from said delay quantity generating means and the reference clock signal.

2. The pulse width modulation circuit as claimed in claim 1, wherein said signal generating means comprises:

a digital-to-analog converter circuit converting the digital data input signal into an analog signal; and a division circuit generating the predetermined signal based on the analog signal from said digital-to-analog converter circuit.

3. The pulse width modulation circuit as claimed in claim 1, wherein said modulated signal generating means sets a reference time width of pulse width modulation to a value less than a period of the reference clock signal.

4. The pulse width modulation circuit as claimed in claim 3, wherein the digital data input signal is made up of image data, and a writing phase within one dot is controlled with reference to a non-inverted or inverted clock signals of the reference clock signal.

5. The pulse width modulation circuit as claimed in claim 1, wherein said modulated signal generating means switches a reference time width of pulse width modulation between a value less than a period of the reference clock signal and a value equal to the period of the reference clock signal.

6. The pulse width modulation circuit as claimed in claim 5, wherein the digital data input signal is made up of image data, and a writing phase within one dot is controlled with reference to a non-inverted or inverted clock signals of the reference clock signal.

7. The pulse width modulation circuit as claimed in claim 1, wherein a plurality of systems are provided with respect to said modulated signal generating means, and each of the systems includes said signal generating means and said delay quantity generating means.

8. A pulse width modulation circuit comprising:

a signal generating circuit generating a reference clock signal and a predetermined signal which is approximately inversely proportional to a digital data input signal;

a delay quantity generating circuit delaying the reference clock signal by a desired phase delay to output a pulse signal, based on the predetermined signal from said signal generating circuit;

a delay quantity controller controlling a delay quantity of said delay quantity generating circuit; and a modulated signal generator generating a modulated signal which is pulse-width-modulated based on the pulse signal from said delay quantity generating circuit and the reference clock signal.

9. A pulse width modulation circuit comprising:

first signal generating means for generating a high-frequency clock signal synchronized to a reference clock signal by frequency-multiplying the reference signal, and generating a plurality of pulse signals having mutually different phases from the high-frequency clock signal;

pulse selecting means for selecting one of the plurality of pulse signals based on upper bit data of a digital data input signal which is synchronized to the reference clock signal;

second signal generating means for generating a predetermined signal which is approximately inversely proportional to lower bit data of the digital data input signal;

delay quantity generating means for delaying said one of the plurality of pulse signals from said pulse selecting means by a desired phase delay to output a pulse signal, based on the predetermined signal;

delay quantity control means for controlling a delay quantity of said delay quantity generating means; and modulated signal generating means for generating a modulated signal which is pulse-width-modulated based on the pulse signal from said delay quantity generating means and said one of the plurality of pulse signals.

10. The pulse width modulation circuit as claimed in claim 9, wherein said second signal generating means comprises:

a digital-to-analog converter circuit converting the digital data input signal into an analog signal; and a division circuit generating the predetermined signal based on the analog signal from said digital-to-analog converter circuit.

11. The pulse width modulation circuit as claimed in claim 9, wherein said modulated signal generating means sets a reference time width of pulse width modulation to a value less than a period of the reference clock signal.

12. The pulse width modulation circuit as claimed in claim 11, wherein the digital data input signal is made up of image data, and a writing phase within one dot is controlled with reference to a non-inverted or inverted clock signals of the reference clock signal.

13. The pulse width modulation circuit as claimed in claim 9, wherein said modulated signal generating means switches a reference time width of pulse width modulation between a value less than a period of the reference clock signal and a value equal to the period of the reference clock signal.

14. The pulse width modulation circuit as claimed in claim 13, wherein the digital data input signal is made up of image data, and a writing phase within one dot is controlled with reference to a non-inverted or inverted clock signals of the reference clock signal.

15. The pulse width modulation circuit as claimed in claim 9, wherein a plurality of systems are provided with respect to said modulated signal generating means, and each of the systems includes said second signal generating means and said delay quantity generating means.

16. A pulse width modulation circuit comprising:

a first signal generating circuit generating a high-frequency clock signal synchronized to a reference clock signal by frequency-multiplying the reference signal, and generating a plurality of pulse signals having mutually different phases from the high-frequency clock signal;

a selector selecting one of the plurality of pulse signals based on upper bit data of a digital data input signal which is synchronized to the reference clock signal;

a second signal generating circuit generating a predetermined signal which is approximately inversely proportional to lower bit data of the digital data input signal;

a delay quantity generating circuit delaying said one of the plurality of pulse signals from said selector by a desired phase delay to output a pulse signal, based on the predetermined signal;

a delay quantity controller controlling a delay quantity of said delay quantity generating circuit; and a modulated signal generator generating a modulated signal which is pulse-width-modulated based on the pulse signal from said delay quantity generating circuit and said one of the plurality of pulse signals.

17. An optical write unit which drives a light source by an image modulated signal which is pulse-width-modulated based on input digital multi-level image data, and forms an electrostatic latent image by scanning a photoconductor body by scanning means using a scanning light emitted from the light source, said optical write unit comprising:

a pulse width modulation circuit outputting the image modulated signal; and a light source driver driving the light source by the image modulated signal output from said pulse width modulation circuit, wherein said pulse width modulation circuit comprises:
a signal generating circuit generating a reference clock signal and a predetermined signal which is approximately inversely proportional to the input digital multi-level image data;

a delay quantity generating circuit delaying the reference clock signal by a desired phase delay to output a pulse signal, based on the predetermined signal from said signal generating circuit;

a delay quantity controller controlling a delay quantity of said delay quantity generating circuit; and a modulated signal generator generating the image modulated signal which is pulse-width-modulated based on the pulse signal from said delay quantity generating circuit and the reference clock signal.

18. The optical write unit as claimed in claim 17, further comprising:

a sensor detecting the scanning light from said scanning means at a predetermined position and outputting a detection signal; and a clock generator generating the reference clock signal in synchronism with the detection signal, said clock generator, said light source driver and said pulse width modulation circuit being integrated within a single integrated circuit chip.

19. The optical write unit as claimed in claim 17, further comprising:

character region recognizing means for recognizing a character region from the input digital multi-level image data and outputting a character region signal; and a write data generator generating write data based on the character region signal, wherein said pulse width modulation circuit carries out a pulse width modulation with respect to a non-character region using one period of the reference clock signal as corresponding to one pixel, and carries out a pulse width modulation with respect to the character region using one-half period of the reference clock signal as corresponding to one pixel, in response to the character region signal.

20. An optical write unit which drives a light source by an image modulated signal which is pulse-width-modulated based on input digital multi-level image data, and forms an electrostatic latent image by scanning a photoconductor body by scanning means using a scanning light emitted from the light source, said optical write unit comprising:

a pulse width modulation circuit outputting the image modulated signal; and a light source driver driving the light source by the image modulated signal output from said pulse width modulation circuit, wherein said pulse width modulation circuit comprises:
a first signal generating circuit generating a high-frequency clock signal synchronized to a reference clock signal by frequency-multiplying the reference signal, and generating a plurality of pulse signals having mutually different phases from the high-frequency clock signal;

a selector selecting one of the plurality of pulse signals based on upper bit data of the input digital multi-level image data which is synchronized to the reference clock signal;

a second signal generating circuit generating a predetermined signal which is approximately inversely proportional to lower bit data of the input digital multi-level image data;

a delay quantity generating circuit delaying said one of the plurality of pulse signals from said selector by a desired phase delay to output a pulse signal, based on the predetermined signal;

a delay quantity controller controlling a delay quantity of said delay quantity generating circuit; and a modulated signal generator generating the image modulated signal which is pulse-width-modulated based on the pulse signal from said delay quantity generating circuit and said one of the plurality of pulse signals.

21. The optical write unit as claimed in claim 20, further comprising:

a sensor detecting the scanning light from said scanning means at a predetermined position and outputting a detection signal; and a clock generator generating the reference clock signal in synchronism with the detection signal, said clock generator, said light source driver and said pulse width modulation circuit being integrated within a single integrated circuit chip.

22. The optical write unit as claimed in claim 20, further comprising:

character region recognizing means for recognizing a character region from the input digital multi-level image data and outputting a character region signal; and a write data generator generating write data based on the character region signal, wherein said pulse width modulation circuit carries out a pulse width modulation with respect to a non-character region using one period of the reference clock signal as corresponding to one pixel, and carries out a pulse width modulation with respect to the character region using one-half period of the reference clock signal as corresponding to one pixel, in response to the character region signal.

23. An image forming apparatus comprising:

an optical write unit outputting an image modulated signal which is pulse-width-modulated based on input digital multi-level image data;

a light source driven by the image modulated signal; and means for forming an electrostatic latent image by scanning a photoconductor body by scanning means using a scanning light emitted from the light source, said optical write unit comprising:
- a pulse width modulation circuit outputting an image modulated signal; and
- a light source driver driving the light source by the image modulated signal output from said pulse width modulation circuit,
- wherein said pulse width modulation circuit comprises:
    - a signal generating circuit generating a reference clock signal and a predetermined signal which is approximately inversely proportional to the input digital multi-level image data;
    - a delay quantity generating circuit delaying the reference clock signal by a desired phase delay to output a pulse signal, based on the predetermined signal from said signal generating circuit;
    - a delay quantity controller controlling a delay quantity of said delay quantity generating circuit; and
    - a modulated signal generator generating the image modulated signal which is pulse-width-modulated based on the pulse signal from said delay quantity generating circuit and the reference clock signal.

24. An image forming apparatus comprising:
an optical write unit outputting an image modulated signal which is pulse-width-modulated based on input digital multi-level image data;
a light source driven by the image modulated signal; and
means for forming an electrostatic latent image by scanning a photoconductor body by scanning means using a scanning light emitted from the light source,
said optical write unit comprising:
- a pulse width modulation circuit outputting the image modulated signal; and
- a light source driver driving the light source by the image modulated signal output from said pulse width modulation circuit,
- wherein said pulse width modulation circuit comprises:
    - a first signal generating circuit generating a high-frequency clock signal synchronized to a reference clock signal by frequency-multiplying the reference signal, and generating a plurality of pulse signals having mutually different phases from the high-frequency clock signal;
    - a selector selecting one of the plurality of pulse signals based on upper bit data of the input digital multi-level image data which is synchronized to the reference clock signal;
    - a second signal generating circuit generating a predetermined signal which is approximately inversely proportional to lower bit data of the input digital multi-level image data;
    - a delay quantity generating circuit delaying said one of the plurality of pulse signals from said selector by a desired phase delay to output a pulse signal, based on the predetermined signal;
    - a delay quantity controller controlling a delay quantity of said delay quantity generating circuit; and
    - a modulated signal generator generating the image modulated signal which is pulse-width-modulated based on the pulse signal from said delay quantity generating circuit and said one of the plurality of pulse signals.

25. An optical write method for an image forming apparatus which drives a light source by an image modulated signal which is pulse-width-modulated based on input digital multi-level image data, and forms an electrostatic latent image by scanning a photoconductor body by scanning means using a scanning light emitted from the light source, said optical write method comprising the steps of:
(a) outputting the image modulated signal; and
(b) driving the light source by the image modulated signal obtained by said step (a),
wherein said step (a) includes:
(a1) generating a reference clock signal and a predetermined signal which is approximately inversely proportional to the input digital multi-level image data;
(a2) delaying the reference clock signal by a desired phase delay to output a pulse signal, based on the predetermined signal;
(a3) controlling a delay quantity used in said step (a2); and
(a4) generating the image modulated signal which is pulse-width-modulated based on the pulse signal obtained in said step (a2) and the reference clock signal.

26. An optical write unit method for an image forming apparatus which drives a light source by an image modulated signal which is pulse-width-modulated based on input digital multi-level image data, and forms an electrostatic latent image by scanning a photoconductor body by scanning means using a scanning light emitted from the light source, said optical write method comprising the steps of:
(a) outputting the image modulated signal; and
(b) driving the light source by the image modulated signal obtained by said step (a),
wherein said step (a) includes:
(a1) generating a high-frequency clock signal synchronized to a reference clock signal by frequency-multiplying the reference signal, and generating a plurality of pulse signals having mutually different phases from the high-frequency clock signal;
(a2) selecting one of the plurality of pulse signals based on upper bit data of the input digital multi-level image data which is synchronized to the reference clock signal;
(a3) generating a predetermined signal which is approximately inversely proportional to lower bit data of the input digital multi-level image data;
(a4) delaying said one of the plurality of pulse signals obtained by said step (a3) by a desired phase delay to output a pulse signal, based on the predetermined signal;
(a5) controlling a delay quantity used in said step (a4); and
(a6) generating the image modulated signal which is pulse-width-modulated based on the pulse signal obtained by said step (a4) and said one of the plurality of pulse signals.

* * * * *